(12) United States Patent
Kumagai et al.

(10) Patent No.: US 9,981,580 B2
(45) Date of Patent: May 29, 2018

(54) SEAT FOR VEHICLE

(71) Applicant: TACHI-S CO., LTD., Akishima-shi, Tokyo (JP)

(72) Inventors: Kotaro Kumagai, Tokyo (JP); Atsushi Ishii, Tokyo (JP); Masayuki Taguchi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days. days.

(21) Appl. No.: 15/331,806

(22) Filed: Oct. 21, 2016

(65) Prior Publication Data

US 2017/0113584 A1   Apr. 27, 2017

(30) Foreign Application Priority Data

Oct. 26, 2015 (JP) ................. 2015-209790
Oct. 26, 2015 (JP) ................. 2015-209791
Oct. 27, 2015 (JP) ................. 2015-210784

(51) Int. Cl.
*A47C 7/24* (2006.01)
*B60N 2/58* (2006.01)
*B60N 2/68* (2006.01)

(52) U.S. Cl.
CPC .............. *B60N 2/5825* (2013.01); *B60N 2/68* (2013.01); *B60N 2/686* (2013.01)

(58) Field of Classification Search
CPC ......... B60N 2/5825; B60N 2/68; B60N 2/686
USPC ......... 297/218.1, 218.2, 218.3, 218.4, 218.5, 297/452.58, 452.59, 452.6, 452.61, 297/452.62

See application file for complete search history.

(56) References Cited

U.S. PATENT DOCUMENTS

| 7,255,404 | B2 * | 8/2007 | Neale | B60N 2/5816 297/218.1 |
|---|---|---|---|---|
| 8,157,324 | B2 * | 4/2012 | Matsuzaki | B60N 2/5816 297/218.1 |
| 8,794,708 | B2 * | 8/2014 | Besnard | B29C 44/04 297/218.2 X |
| 9,061,618 | B2 * | 6/2015 | Nakagawa | B60N 2/58 |
| 2009/0085384 | A1 * | 4/2009 | Galbreath | B60N 2/5825 297/218.1 |
| 2013/0119730 | A1 * | 5/2013 | Nakagawa | B60N 2/58 297/218.1 |

FOREIGN PATENT DOCUMENTS

JP   2-132500 U   11/1990
JP   3177316 U   7/2012

* cited by examiner

*Primary Examiner* — Rodney B White
(74) *Attorney, Agent, or Firm* — Shapiro. Gabor and Rosenberger, PLLC

(57) ABSTRACT

A seat for vehicle includes a skin, a substrate to which the skin is applied, and a connection structure for connecting the substrate and the skin. The skin includes a first skin part, and a second skin part made of a soft material for connecting the first skin part and the connection structure. The connection structure includes a first fold-back portion integrally formed with the second skin part, and a second fold-back portion disposed on the substrate. The first fold-back portion is fitted with the second fold-back portion.

9 Claims, 27 Drawing Sheets

SEAT FOR VEHICLE

CLAIM OF PRIORITY

The present application claims priority from Japanese Patent Application JP2015-209790 filed on Oct. 26, 2015, Japanese Patent Application JP2015-209791 filed on Oct. 26, 2015, and Japanese Patent Application JP2015-210784 filed on Oct. 27, 2015, the content of which are hereby incorporated by reference into this application.

BACKGROUND

The present invention relates to a seat for vehicle, for example, applicable to the one which allows exchange of a cover.

The seat for vehicle includes a seat cushion on which an occupant is seated, and a seat back on which the occupant leans. Each of the seat cushion and the seat back includes a frame, a pad supported by the frame, and a skin (trim cover) for covering the pad. The skin covers the pad surface, having its end fixed to the frame via a fixture.

For example, Japanese Utility Model Application Publication No. 2-132500 discloses that the clip and hook of the resin plate are formed for fixation to the end of the seat cover, and holes to be engaged with the clip and the hook are formed in the frame, respectively so as to fasten the seat cover to the frame.

Japanese Utility Model Registration Publication No. 3177316 discloses the method of detachably assembling the cushion to the seat for vehicle. Specifically, the connection support board is disposed to the rear of the cushion for lumber support, and the protrusion is disposed at the side of the slip-off stopping piece at the tip end of the connection support board. The protrusion is inserted rearward from the joined part between the backrest (seat back) and the seat section (seat cushion) so as to prevent the slip-off stopping piece interposed between the backrest and the seat section from being slipped off.

Japanese Utility Model Registration Publication No. 3177316 discloses that each of the connection support board and the slip-off stopping piece exhibits rigidity to a certain degree, and made of thermoplastic resin with flexibility, and a connected part between the connection support board and the slip-off stopping piece is largely bent into the curved shape. This ensures to allow the connection support board and the slip-off stopping piece to grip the lower end of the backrest firmly in the front-to-rear direction, while being mounted on the seat.

SUMMARY

The resin clip as disclosed in Japanese Utility Model Application Publication No. 2-132500 has a cross section with a fold-back portion for tight fitting. Upon removal of the resin clip which has been once fitted, there may cause the risk of damaging to the mating component or the resin clip by itself. It is necessary to adjust the applied force and provide the dedicated tool for removing the clip, resulting in prolonged time for such operation.

In the structure as disclosed in Japanese Utility Model Registration Publication No. 3177316, upon insertion of the slip-off stopping piece with largely curved shape with respect to the connection support board into the joined part between the backrest and the seat section rearward, the protrusion is inserted while largely deforming the part for connecting the connection support board and the slip-off stopping piece. In this case, such member is squeezed into the narrow space while being deformed. A great deal of labor is needed for the operation, which may deteriorate the operation efficiency.

Japanese Utility Model Registration Publication No. 3177316 does not disclose the method of fitting the flexible cover (trim cover) with the seat for covering over the surface thereof.

It is an object of the disclosure to provide a seat for vehicle, which allows easy attachment and detachment of the skin. Any other task and novel characteristics will be clarified by the following description and accompanied drawings.

The representative implementation of the disclosed features will be briefly summarized as below.

(1) A seat for vehicle includes a skin, a substrate to which the skin is applied, and a connection structure for connecting the substrate and the skin. The skin includes a first skin part, and a second skin part made of a soft material for connecting the first skin part and the connection structure. The connection structure includes a first fold-back portion integrally formed with the second skin part, and a second fold-back portion disposed on the substrate. The first fold-back portion is fitted with the second fold-back portion.

(2) A seat for vehicle includes a connection structure for connecting the substrate and the skin. The skin includes a first skin part, and a second skin part made of a soft material for connecting the first skin part and the connection structure. The connection structure includes a protruding member disposed on the second skin part, and a hole formed in the substrate. The protruding member includes a shaft portion extending in a direction of the substrate, a heat portion disposed on a tip end of the shaft portion, and a knob extending from an end of the second skin part. The protruding member is fitted with the hole.

(3) The seat for vehicle includes a seat cushion on which an occupant is seated, and a seat back on which the occupant seated on the seat cushion leans. The seat back includes a base seat provided with a cushion pad and a backboard for covering the back surface of the cushion pad, and a cover provided with a trim cover for covering the surface of the cushion pad of the base seat, on which the occupant leans, and a resin part made of flexible resin for covering the side surface of the cushion pad. The trim cover and the resin part of the cover are sewn and joined. The resin part of the cover and the backboard of the base seat are connected by engaging the resin part and the backboard on the surface of the backboard in contact with the seat cushion, and the surface corresponding to the side surface of the cushion pad.

(4) The seat for vehicle includes a seat cushion on which an occupant is seated, and a seat back on which the occupant seated on the seat cushion leans. The seat back includes a cover, a cushion pad, and a backboard for covering a back surface of the cushion pad. The cover includes a trim cover for covering the surface of the cushion pad, on which the occupant leans, and a resin part made of flexible resin for covering the side surface of the cushion pad. The trim cover and the resin part are sewn and joined together. The resin part and the backboard are connected by engaging the hook or the protrusion of the backboard with the hook, the protrusion, or the hole of the resin part.

(5) Provided is a method of manufacturing a seat for vehicle including a seat cushion on which an occupant is seated, and a seat back on which the occupant seated on the seat cushion leans. The seat back includes a base seat provided with a cushion pad and a backboard for covering the back surface of the cushion pad, and a cover provided with a trim cover for covering the surface of the cushion pad of the base seat, on which the occupant leans, and a resin part made of flexible resin for covering the side surface of the cushion pad. The trim cover and the resin part of the cover are sewn and joined. In the state where the seat cushion and the base seat are assembled, the resin part of the cover is inserted into the part in contact with the seat cushion and the base seat so that the hook, the protrusion, or the hole of the resin part is engaged with the hook or the protrusion of the backboard. Then the cover and the base seat are connected by engaging the concavo-convex part formed on the resin part of the cover with the concavo-convex part formed on the side surface of the backboard.

The seat for vehicle as described above facilitates operations for attachment or detachment of the skin.

DESCRIPTION OF THE PREFERRED EMBODIMENTS

Figure 1:
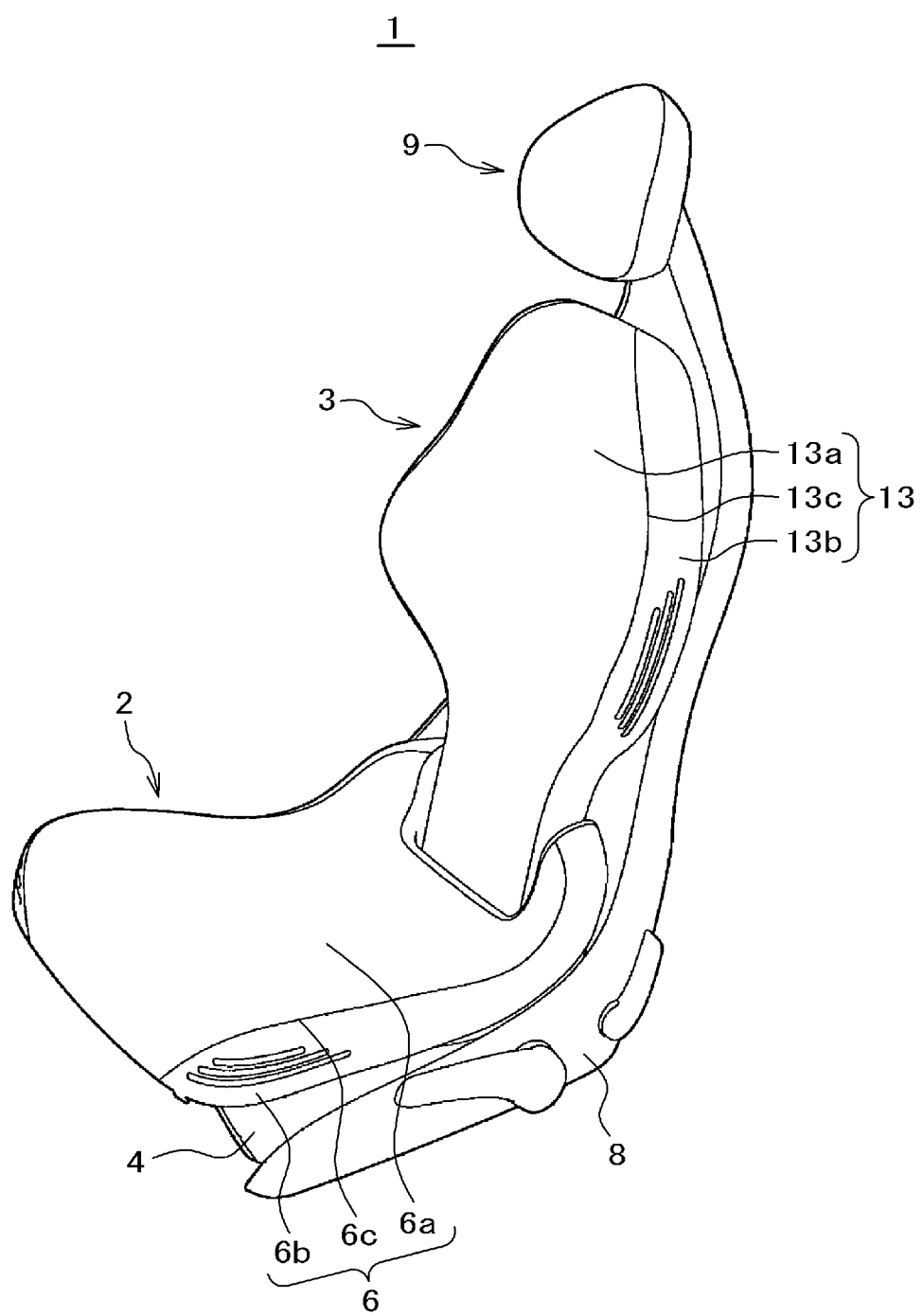
FIG. 1 is a perspective view of a seat for vehicle according to a first embodiment.

Embodiments and modified examples will be described referring to the drawings. In the following description, the same components will be designated with the same codes, and repetitive explanations thereof, thus will be omitted. Each width, thickness, shape of the respective components may be schematically shown in the drawings for the purpose of clarifying the explanation. They are expressed for exemplifying purpose with no intention to limit the interpretation with respect to the present invention.

First Embodiment

Figure 2:
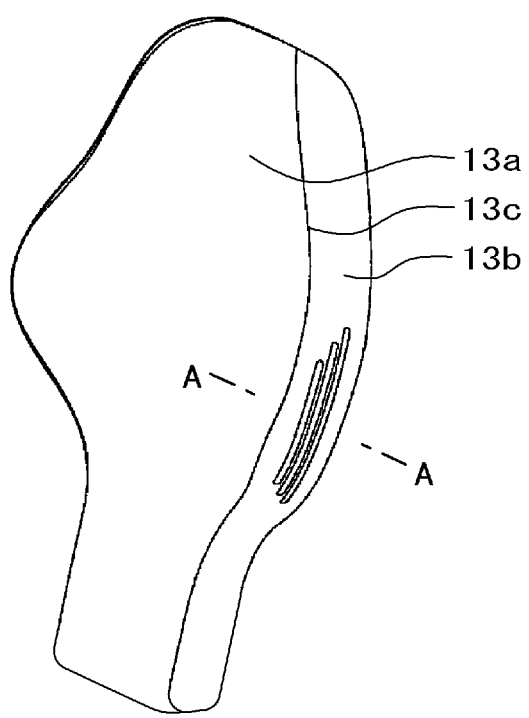
FIG. 2 is a perspective view of a seat back as shown in FIG. 1.
Figure 3:
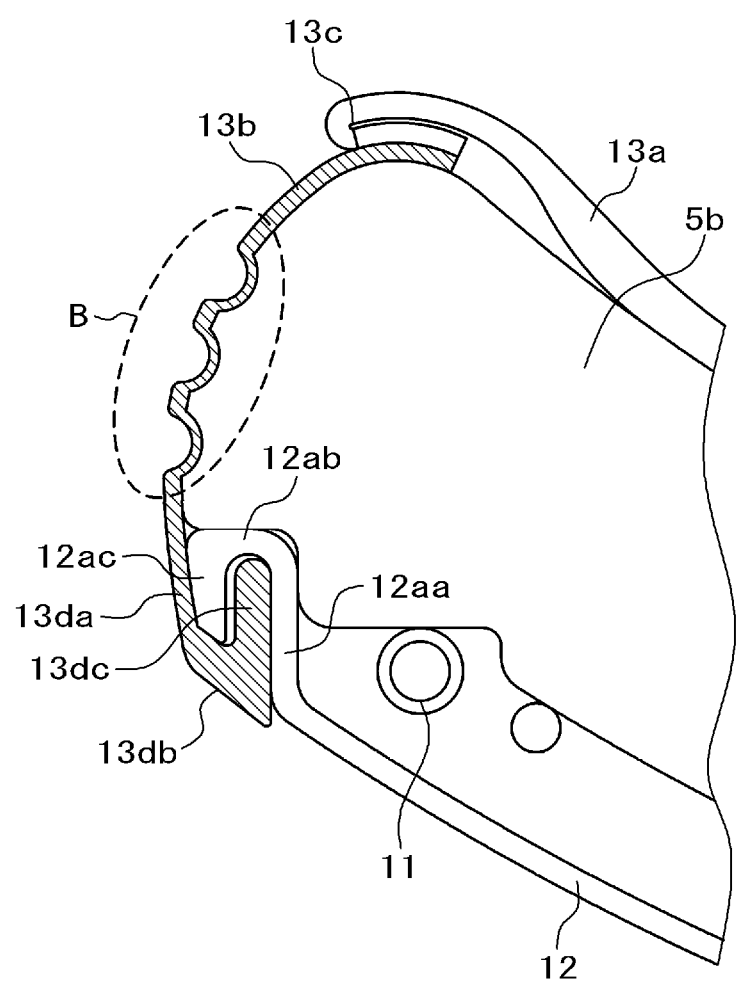
FIG. 3 is a sectional view taken along line A-A of FIG. 2 (non-seated state)
Figure 4:
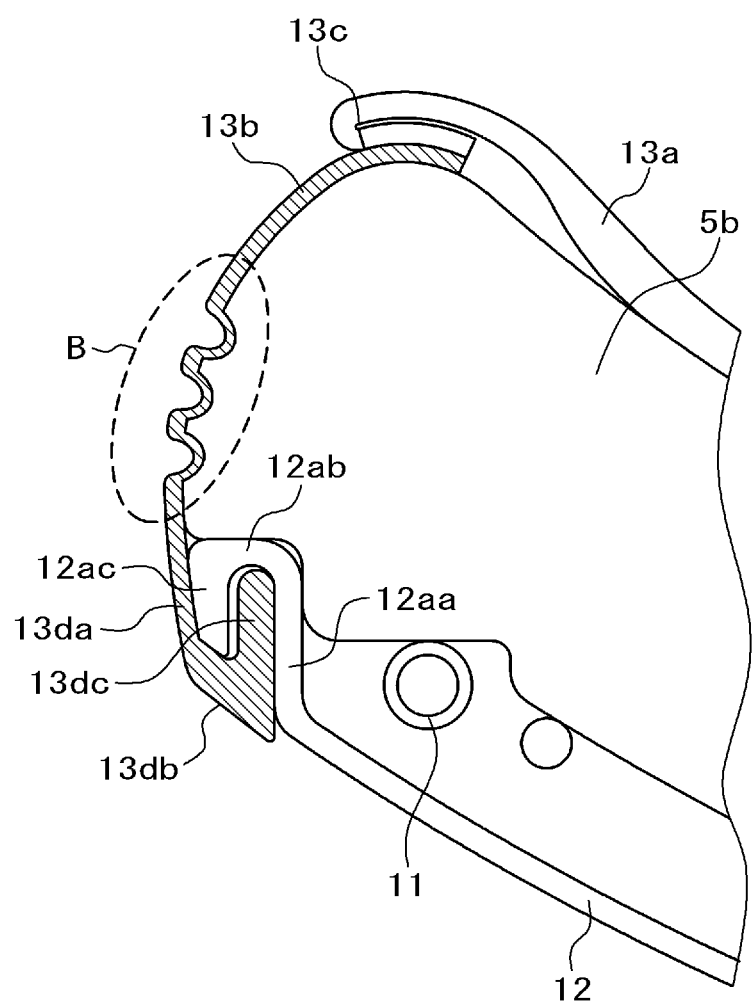
FIG. 4 is a sectional view taken along line A-A of FIG. 2 (seated state)

FIG. 1 is a perspective view of a seat for vehicle according to a first embodiment. FIG. 2 is a perspective view of a seat back as shown in FIG. 1. FIG. 3 is a sectional view taken along line A-A of FIG. 2 (non-seated state). FIG. 4 is a sectional view taken along line A-A of FIG. 2 (seated state).

The seat 1 for vehicle includes a seat cushion 2 as a section on which an occupant is seated, a seat back 3 on which the occupant leans, and a head rest 9 on which the head of the seated occupant is laid.

The seat cushion 2 includes a frame 4 as the skeleton structure, a pad (not shown) fixed to the frame 4, a skin 6 for covering the pad, and a frame cover 8 for covering the lower part of the frame 4. The frame 4 is made of the material with high rigidity, for example, steel, rigid synthetic resin and the like.

The skin 6 includes a first skin part 6a and a second skin part 6b. The first skin part 6a is shaped to have a part in contact with at least the buttock of the occupant to be seated, which may have substantially the same shape as the upper surface of the pad. The second skin part 6b includes a side part for covering at least the front, left and right parts of the pad, a joint part sewn with the first skin part 6a, and a connection part folded inward from the front, left and right sides.

The end of the first skin part 6a and the connection part of the second skin part 6b are sewn and joined along a seam 6c as the joint part by using the sewing thread. They are sewn together so that the seam 6c is hidden inside the first and the second skin parts for improving the aesthetic appearance.

The first skin part 6a may be made of leather, synthetic leather, fabric, equivalents thereof, or the member derived from combining those materials. The second skin part 6b may be made of soft material, for example, elastomer, soft resin, formed nonwoven fabric, equivalents thereof, or the material derived from arbitrary combination thereof. The elastomer may be a rubber-like industrial material which exhibits elasticity, for example, the olefin-based thermoplastic elastomer. The frame cover 8 made of synthetic resin is formed through the resin molding process.

The seat back 3 includes a pipe frame 11 as a skeleton structure, a backboard 12 supported by the pipe frame 11, a pad 5b fixed to the backboard 12, and a skin 13 for covering the pad 5b. The pipe frame 11 is swingably linked with the frame 4 at the side of the seat cushion 2 by a not shown reclining mechanism. The pipe frame 11 is made of steel. The backboard 12 is made of rigid synthetic resin. The pad 5b is a member which offers cushioning property to the seated occupant, and made of the foamable resin such as urethane.

The skin 13 includes a first skin part 13a and a second skin part 13b. The second skin part 13b is separated into left and right sections while interposing the first skin part 13a. Each end of the first skin part 13a and the connection part of the second skin part 13b are sewn and joined along a seam 13c as the joint part by using a sewing thread. The sewing is performed to make the seam 13c hidden inside the first and the second skin parts for the purpose of improving aesthetic appearance.

The first skin part 13a may be made of leather, synthetic leather, fabric, equivalents thereof, or the member derived from combining those materials. The second skin part 13b may be made of soft material, for example, elastomer, soft resin, formed nonwoven fabric, equivalents thereof, or the material derived from arbitrary combination thereof. This allows the first skin part 13a and the second skin part 13b to be sewn together by a sewing machine.

Figure 5:
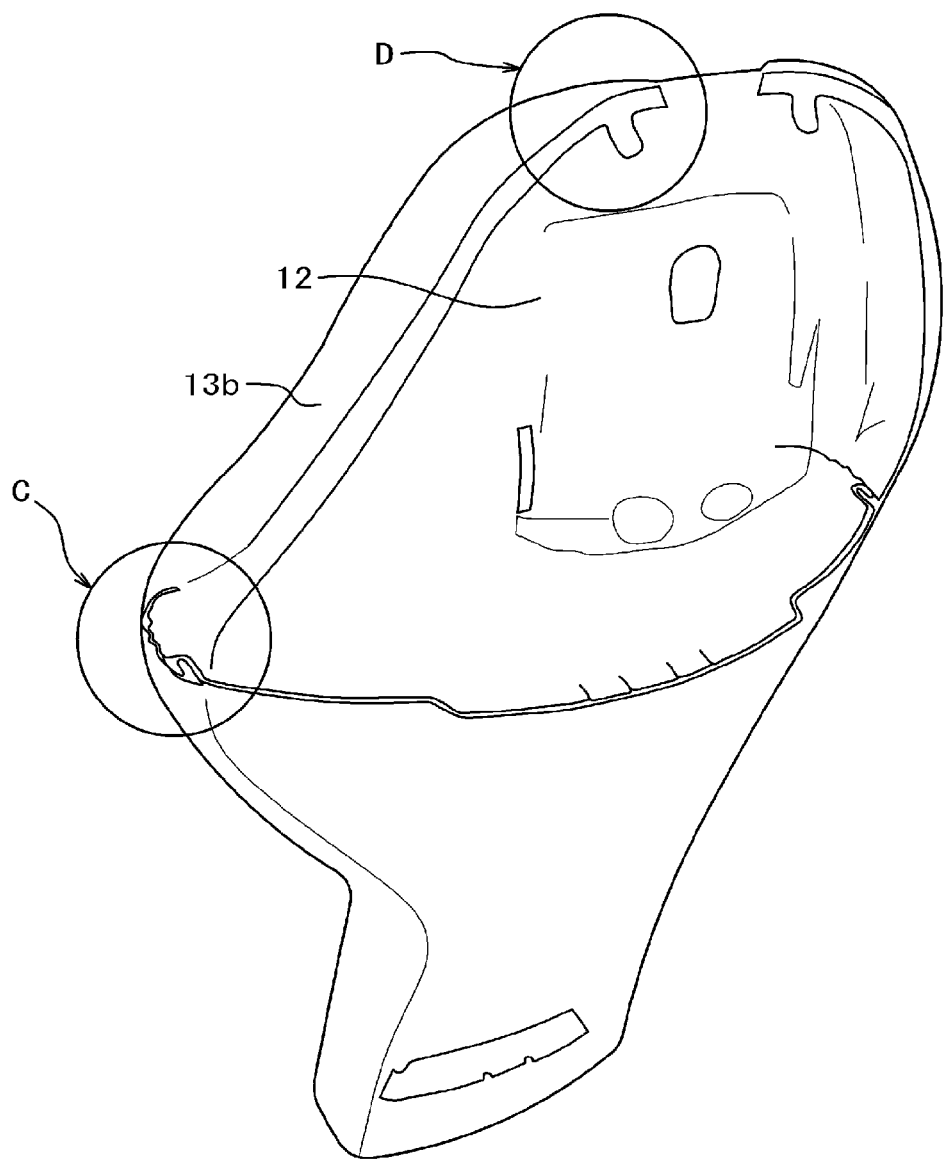
FIG. 5 is a perspective view representing the seat back as shown in FIG. 1 when seen from the back side.
Figure 6:
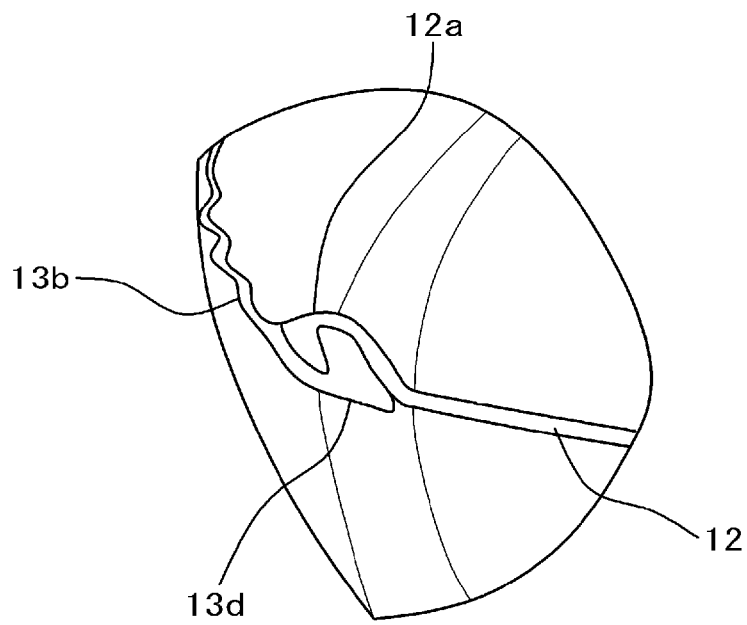
FIG. 6 is an enlarged view of a part C as shown in FIG. 5.
Figure 7:
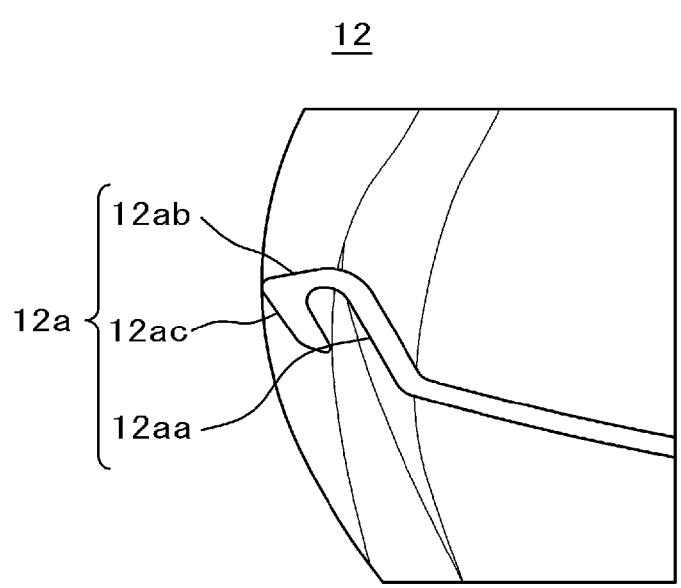
FIG. 7 is a perspective view of the seat back as shown in FIG. 6.
Figure 8:
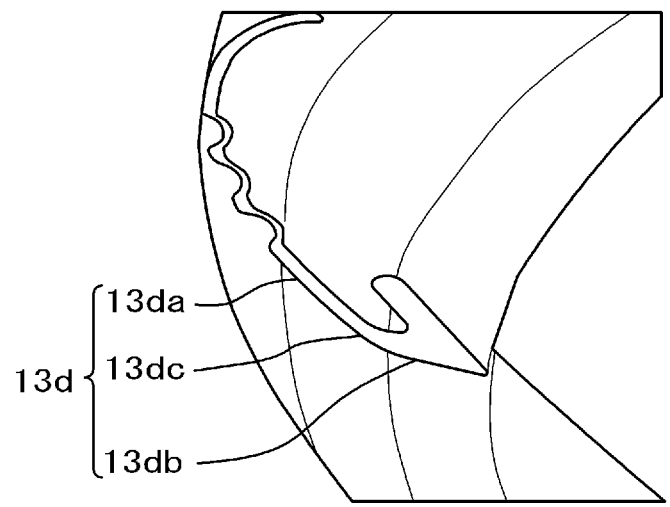
FIG. 8 is a perspective view of a second skin part as shown in FIG. 6.

FIG. 5 is a perspective view illustrating the seatback as shown in FIG. 1 when seen from the back side. FIG. 6 is an enlarged view of a part C of FIG. 5. FIG. 7 is a perspective view of the seat back as shown in FIG. 6. FIG. 8 is a perspective view of the second skin part as shown in FIG. 6. FIGS. 5 to 8 represent horizontal cross sections of the backboard 12 and the skin part 13b.

As FIG. 5 shows, the second skin part 13b is separated into left and right sections at upper and lower parts of the backboard 12.

As FIG. 7 shows, a peripheral edge of the back side of the backboard 12 includes a first fold-back portion 12aa which is folded back inward, a second fold-back portion 12ab which is folded back outward from the first fold-back portion 12aa, and a third fold-back portion 12ac which is further folded back outward from the second fold-back portion 12ab. Those portions constitute a folded back part 12a having a U-like groove in a horizontal sectional view.

As FIG. 8 shows, an end 13da of the second skin part 13b, opposite to the seam 13c includes a first fold-back portion 13db which is folded back inward, and a second fold-back portion 13dc which is folded back further inward. Those portions constitute the folded back part 13d having the U-like groove in the horizontal sectional view. The same material is used for forming the first fold-back portion 13db and the second fold-back portion 13dc integrally with the second skin part 13b simultaneously in manufacturing thereof through the molding process.

The integral structure of the backboard 12 and the pad 5b is covered with the skin 13. The second fold-back portion 13dc of the protruding folded back part 13d is inserted into the groove of the folded back part 12a of the backboard 12 with predetermined pressure force so that the folded back parts 13d and 12a are fitted. As the folded back parts 12a and 13d have the same cross sections sequentially formed along the outer peripheral direction, it is possible to fit the skin 13 while performing positional adjustment along the outer peripheral direction. The fitting allows the skin 13 to be tightly applied to the surface of the integrated structure of the backboard 12 and the pad 5b so that assembly of the seat 1 for vehicle is completed. In the embodiment, a connection structure for connecting the backboard 12 as the substrate and the second skin part 13b is constituted by the folded back part 13d of the second skin part 13b, and the folded back part 12a of the backboard 12 as the substrate.

Figure 9:
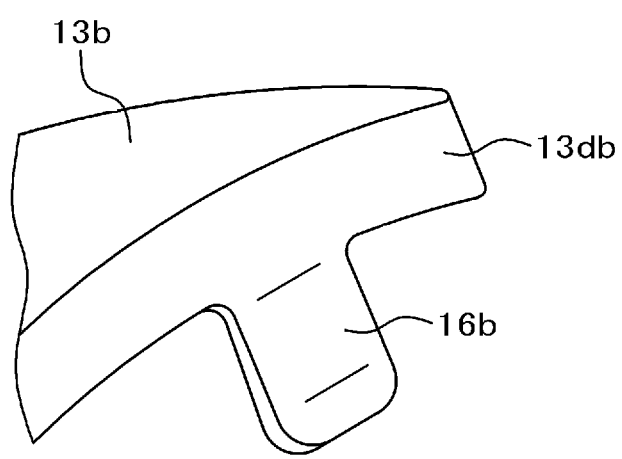
FIG. 9 is an enlarged view of a part D as shown in FIG. 5.

FIG. 9 is an enlarged view of a part D as shown in FIG. 5.

A knob 16b as a protruding member is formed at the first fold-back portion 13db of the second skin part 13b at the upper part of the backboard 12. The same material is used for forming the knob 16b and the second skin part 13b which are integrally produced in manufacturing thereof simultaneously.

For disengaging operation, the knob 16b is pulled outward (direction opposite to the backboard 12) so that the folded back part 13d is slipped off from the folded back part 12a for disengagement. The left and right first fold-back portions 13db are not connected, and each end of the first fold-back portions 13db is disposed at the upper part of the backboard 12, which allows disengaging operation. Accordingly, the knob 16b is not necessarily required.

Figure 10:
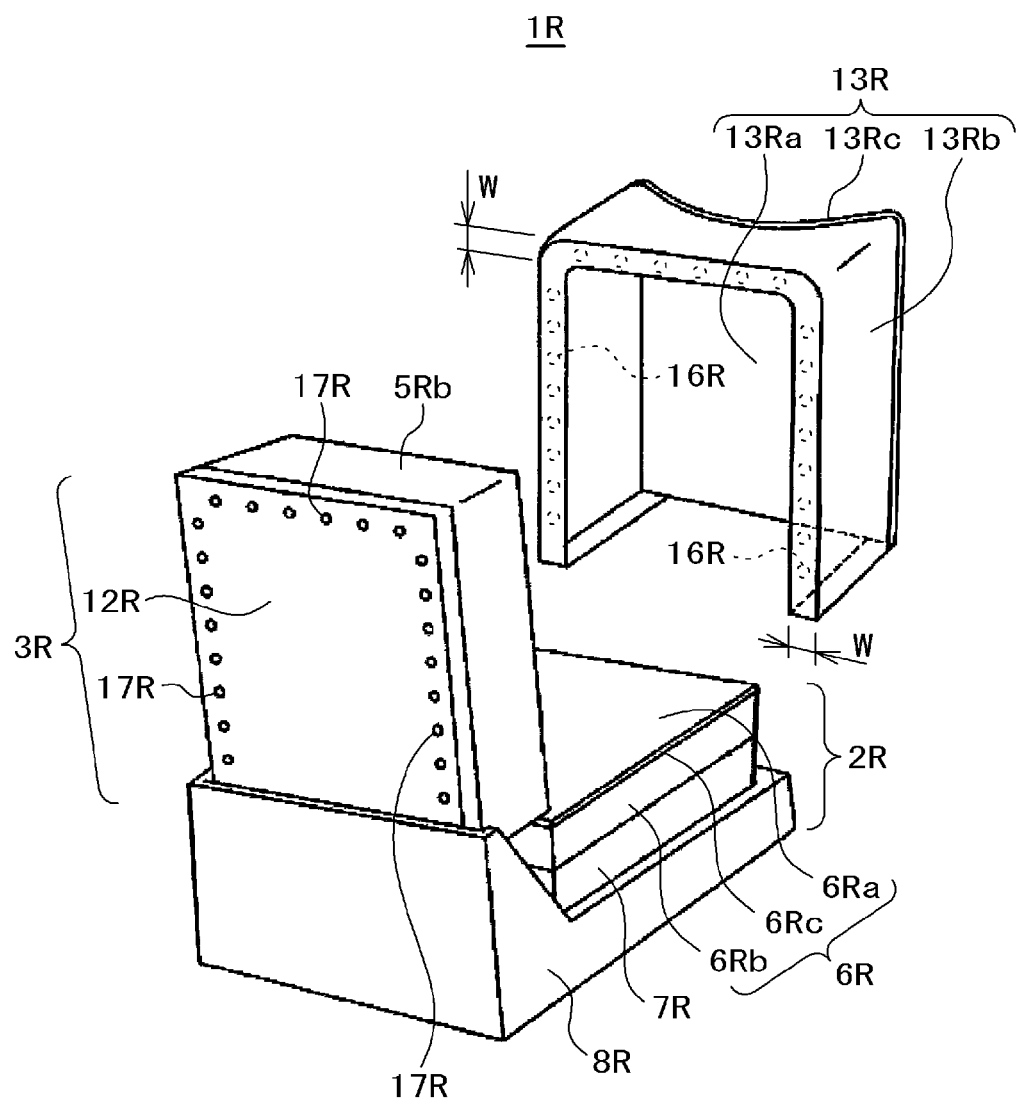
FIG. 10 is an exploded perspective view of a seat for vehicle according to a comparative example, when seen from the back side.
Figure 11:
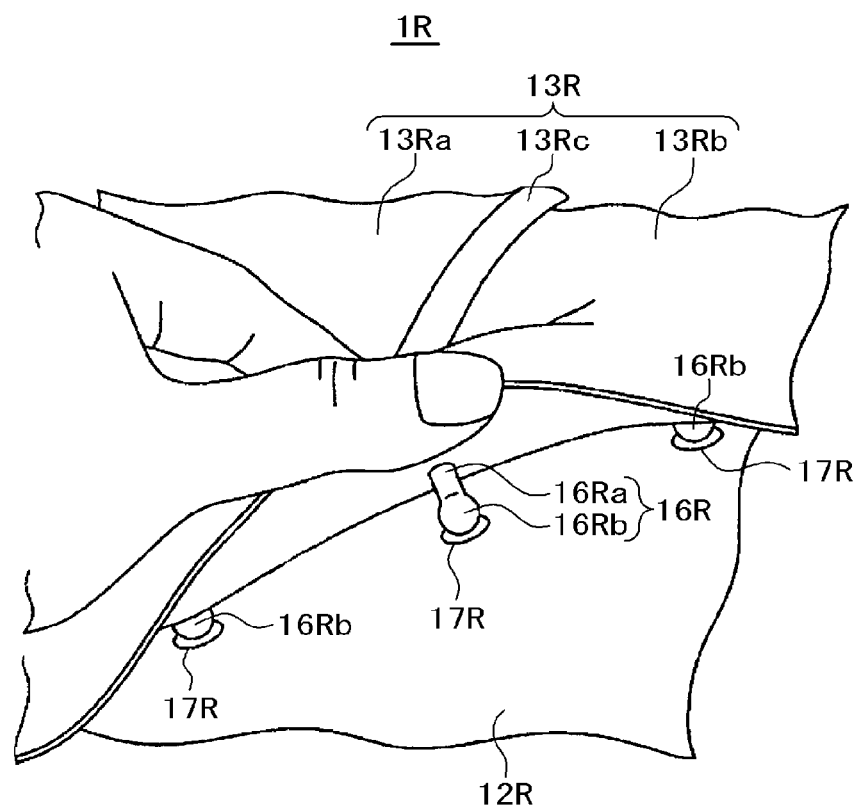
FIG. 11 is a view illustrating a shape of a protruding member according to the comparative example.

FIG. 10 is an exploded perspective view of a seat for vehicle according to a comparative example when seen from the back side. FIG. 11 is a perspective view for explaining the shape of the protruding member of the seat for vehicle as shown in FIG. 10. The seat 1R for vehicle includes a seat cushion 2R on which the occupant is seated, and a seat back 3R on which the seated occupant leans.

The seat cushion 2R includes a frame (not shown) as the skeleton structure, a pad (not shown) fixed to the frame, a skin 6R for covering the pad, a side cover 7R for covering the side surface of the frame, and a frame cover 8R for covering the lower part of the frame.

The end of a first skin part 6Ra and the connection part of a second skin part 6Rb are sewn and joined along a seam 6Rc as the joint part by using the sewing thread. They are sewn together so that the seam 6Rc is hidden inside the first and the second skin parts for improving the aesthetic appearance.

The first skin part 6Ra and the second skin part 6Rb are made of the same members as those used for forming the first skin part 6a and the second skin part 6b of the embodiment, respectively. The side cover 7R and the frame cover 8R are made of synthetic resin through the resin molding process.

The seat back 3R includes a pipe frame (not shown) as the skeleton structure, a backboard 12R supported by the pipe frame, a pad 5Rb fixed to the backboard 12R, and a skin 13R for covering the pad 5Rb. The backboard 12R is made of rigid synthetic resin. The pad 5Rb is a member which offers cushioning property to the seated occupant, and made of foamable resin such as urethane.

The skin 13R is constituted by a first skin part 13Ra and a second skin part 13Rb. The end of the first skin part 13Ra and the connection part of the second skin part 13Rb are sewn and joined along a seam 13Rc as the joint part by using the sewing thread. They are sewn together so that the seam 13Rc is hidden inside the first and the second skin parts for improving the aesthetic appearance.

The first skin part 13Ra and the second skin part 13Rb are made of the same members as those used for forming the first skin part 13a and the second skin part 13b, respectively.

The surface of the second skin part 13Rb, opposite to the seam 13Rc is folded back inward with a predetermined width (W). A fold-back portion 13Rba includes a plurality of protruding members 16R. The same material is used for forming the protruding members 16R and the second skin part 13Rb which are integrally produced in manufacturing thereof simultaneously.

The protruding member 16R includes a shaft portion 16Ra protruding inward of the second skin part 13Rb, and a spherical head portion 16Rb with a large diameter, which is formed on the tip end of the shaft portion 16Ra. A diameter of a hole 17R of the backboard 12R is smaller than the diameter of the head portion 16Rb of the protruding member 16R formed on the second skin part 13Rb. Furthermore, the diameter of the hole 17R is determined so as to allow the head portion 16Rb which has been pushed into the hole 17R with the predetermined pressure force to pass through the hole 17R while being elastically deformed.

The skin 13R is covered over the integrated structure of the backboard 12R and the pad 5b, and each of the head portions 16Rb of the protruding member 16R of the second skin part 13R is inserted into the corresponding hole 17R of the backboard 12R with the predetermined pressure force so that the respective protruding members 16R are engaged or fitted with the corresponding holes 17R. The head portion 16Rb of the protruding member 16R is pushed into the hole 17R formed around the peripheral edge of the backboard 12R. As the diameter of the head portion 16Rb is larger than that of the hole 17R, the pushed head portion 16Rb cannot be easily slipped off from the hole 17R.

In the comparative example, the positional relationship between the skin and the substrate such as the backboard is fixed. Upon fixing the skin, unevenness in the skin sewing work may cause discrepancy in patterns (in horizontal/vertical direction), and wrinkle owing to biased tension, resulting in the risk of deteriorating appearance quality.

In the first embodiment, the groove with the U-like cross section, which is formed on the substrate such as the back frame is fitted with the groove with the U-like cross section formed on the fixture for the skin. The fitted part between the substrate and the fixture is formed to have the same cross sections in succession along the outer periphery. The fixture may be fitted while having the position adjusted along the outer peripheral direction. The embodiment allows lessening of the discrepancy in patterns upon skin sewing work (in horizontal/vertical direction), and the wrinkle owing to biased tension compared with the comparative example.

The fitting strength between the substrate and the fixture may be arbitrarily adjusted by forming ribs or protrusions on the substrate at appropriate intervals, forming the fixture to have the corrugated cross section, and arranging the ribs.

Molding the knob into the fixture may cause the fixture to be removed, which allows application to an exchangeable cover.

Referring to FIG. 1, the seat cushion 2 includes the connection structure similar to the one as described above. That is, the folded back part similar to the folded back part 13d as shown in FIG. 8 is formed around the peripheral edge of the second skin part 6b constituting the skin 6. Meanwhile, the folded back part similar to the folded back part 12a as shown in FIG. 7 is formed around the peripheral edge of the frame 4. A knob similar to the knob 16b is disposed on the first folded back part of the second skin part 6b to the front of the frame 4. The folded back part at the side of the second skin part 6b is inserted into the folded back part at the side of the frame 4 as the substrate for connection between the second skin part 6b and the frame 4.

The use of the soft material for forming the skin may cause hindrance to deflective property of the pad to be contained, and make the occupant feel uneasy in taking the seat depending on such condition as the shape and thickness. As FIG. 3 shows, the second skin part 13b partially (elliptical area B with dashed line) includes a relief-like slit. In the case where the occupant is seated to apply force to the seat surface, the slit formed in the second skin part 13b in the seated state (FIG. 4) is crushed more than the case in the non-seated state (FIG. 3) for assuring sufficient deflection as original property of the pad. By modifying the cross section or adjusting the thickness of the skin, such properties as flexibility and deflection may be imparted to the skin made of soft material arbitrarily irrespective of location and range.

MODIFIED EXAMPLE 1-1

Figure 12:
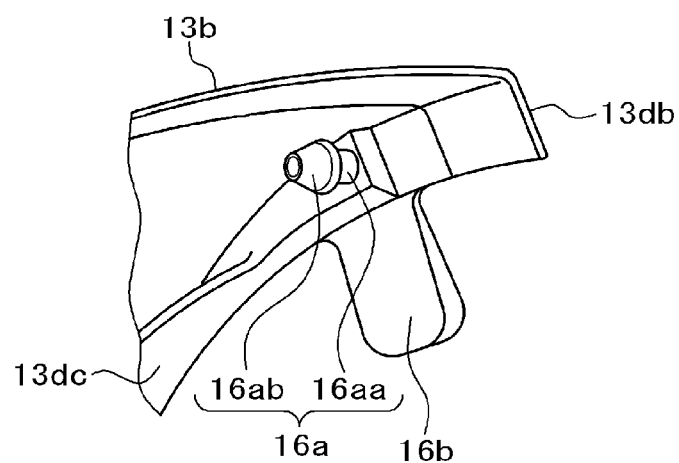
FIG. 12 is an explanatory view of a connection structure according to a modified example 1-1.
Figure 13:
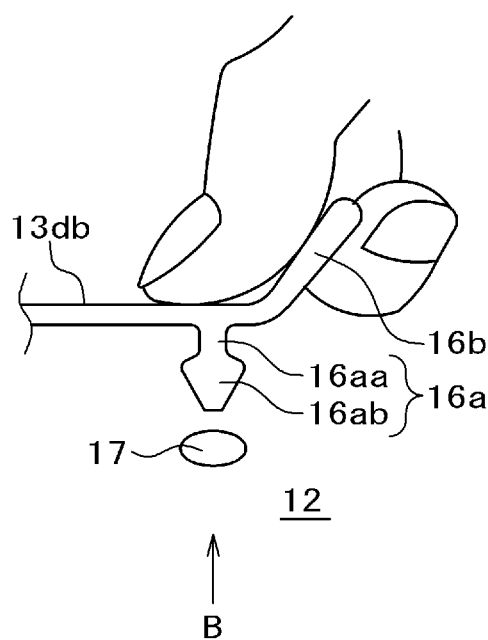
FIG. 13 is an explanatory view of the connection structure according to the modified example 1-1.
Figure 14:
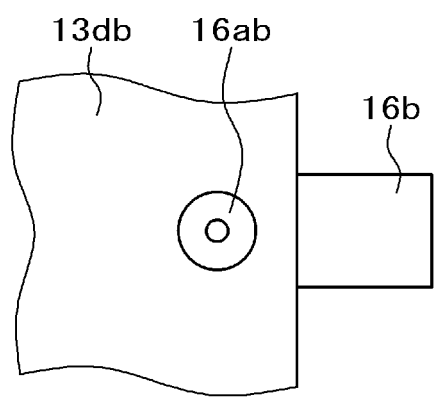
FIG. 14 is an explanatory view of the connection structure according to the modified example 1-1.

A first modified example of the first embodiment will be described referring to FIGS. 12 to 14. FIGS. 12 to 14 are views for explaining the connection structures according to the modified example 1-1. The connection structure according to the modified example 1-1 is formed by adding the following connection structure to the one according to the first embodiment (constituted by the folded back part 13*d* of the second skin part 13*b*, and the folded back part 12 of the backboard 12*a* as the substrate).

The hole 17 is formed in the backboard 12. The hole 17 is formed into a circular shape in a plan view. An insertion part 16*a* as the protruding member is formed on the first fold-back portion 13*db* adjacent to the knob 16*b* of the second skin part 13*b*. Likewise the knob 16*b*, the same material is used for forming the insertion part 16*a* and the second skin part 13*b* which are integrally produced in manufacturing of the second skin part 13*b* simultaneously.

The insertion part 16*a* includes a shaft portion 16*aa* protruding inward of the second skin part 13*b*, and a conical head portion 16*ab* which is formed on the tip end of the shaft portion.

The folded back part 13*d* of the second skin part 13*b* is fitted with the folded back part 12*a* of the backboard 12 so that the head portion 16*ab* of the insertion part 16*a* is pushed into the hole 17 formed around the peripheral edge at the upper part of the backboard 12 for connection between the second skin part 13*b* and the backboard 12. This makes it possible to fix the second skin part 13*b* to the backboard 12 more securely than the embodiment. Upon disengaging operation, the knob 16*b* is pulled outward (direction opposite to the backboard 12). Then the head portion 16*ab* is disengaged from the hole 17, thus facilitating disengagement of the second skin part 13*b*. The protruding members fitted with the holes at the left and right sides ensure to lessen the discrepancy in patterns upon skin sewing work (in horizontal/vertical direction), and the wrinkle owing to biased tension compared with the comparative example.

The connection structure for the seat cushion 2 according to the modified example 1-1 is similar to that of the seat back 3. In other words, the following connection structure is added to the connection structure constituted by the folded back part of the second skin part 6*b*, and the folded back part of the frame 4.

The hole similar to the hole 17 is formed in the frame 4. The insertion part similar to the insertion part 16*a* is formed on the first folded back part adjacent to the knob of the second skin part 6*b*. Likewise the knob, the same material is used for forming the insertion part and the second skin part 6*b* which are integrally produced in manufacturing of the second skin part 6*b* simultaneously through the molding process. The insertion part includes a shaft portion similar to the shaft portion 16*aa* protruding inward of the second skin part 6*b*, and a head portion similar to the conical head portion 16*ab*, which is formed at the tip end of the shaft portion.

The folded back part of the second skin part 6*b* is fitted with the folded back part of the frame 4 so that the head portion of the protruding member is pushed into the hole formed around the peripheral edge to the front of the frame 4 for connection between the second skin part 6*b* and the frame 4.

MODIFIED EXAMPLE 1-2

Figure 15:
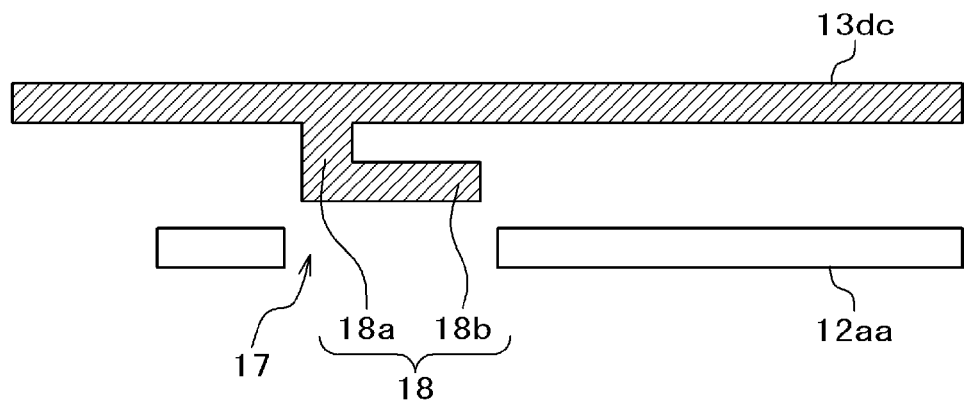
FIG. 15 is an explanatory view of a connection structure according to a modified example 1-2 (before engagement)
Figure 16:
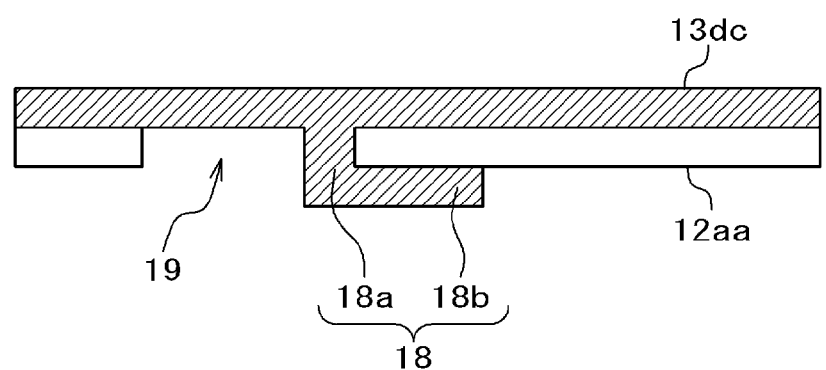
FIG. 16 is an explanatory view of the connection structure according to the modified example 1-2 (after engagement)

A second modified example of the first embodiment will be described referring to FIGS. 15, 16. FIGS. 15, 16 are views for explaining the connection structure according to the modified example 1-2. The connection structure according to the modified example 1-2 is formed by adding the following connection structure to the one according to the first embodiment, or the one formed by combining the first embodiment and the modified example 1-1.

The second fold-back portions 13*dc* at left and right lower sides of the seat back 12 include protruding parts 18, respectively. The protruding part 18 includes a section 18*a* extending toward the seat back 12, and a section 18*b* extending above the seat back 12. The first fold-back portion 12*aa* of the seat back 12 includes a hole 19. The section 18*b* of the protruding part 18 is allowed to pass through the hole 19 of the seat back 12 so as to move the second fold-back portion 13*dc* to the upper side of the seat back 12 for positioning the second skin part 13*b*. The folded back part 13*d* of the second skin part 13*b* is then fitted with the folded back part 12*a* of the seat back 12. This makes it possible to facilitate application of the skin 13 more easily than the embodiment. As the protruding part 18 is fitted with the fold-back portion 12*aa* of the seat back 12, the skin 13 may be fixed more securely than the embodiment. The hole 19 is larger than the section 18*a* of the protruding part 18, which allows positional adjustment of the second skin part 13*b*.

The skin 13 may be fixed further securely by the structure in which the first fold-back portion 13*db* includes the protruding member 16, and the seat back 12 includes the hole 17.

Second Embodiment

Figure 17:
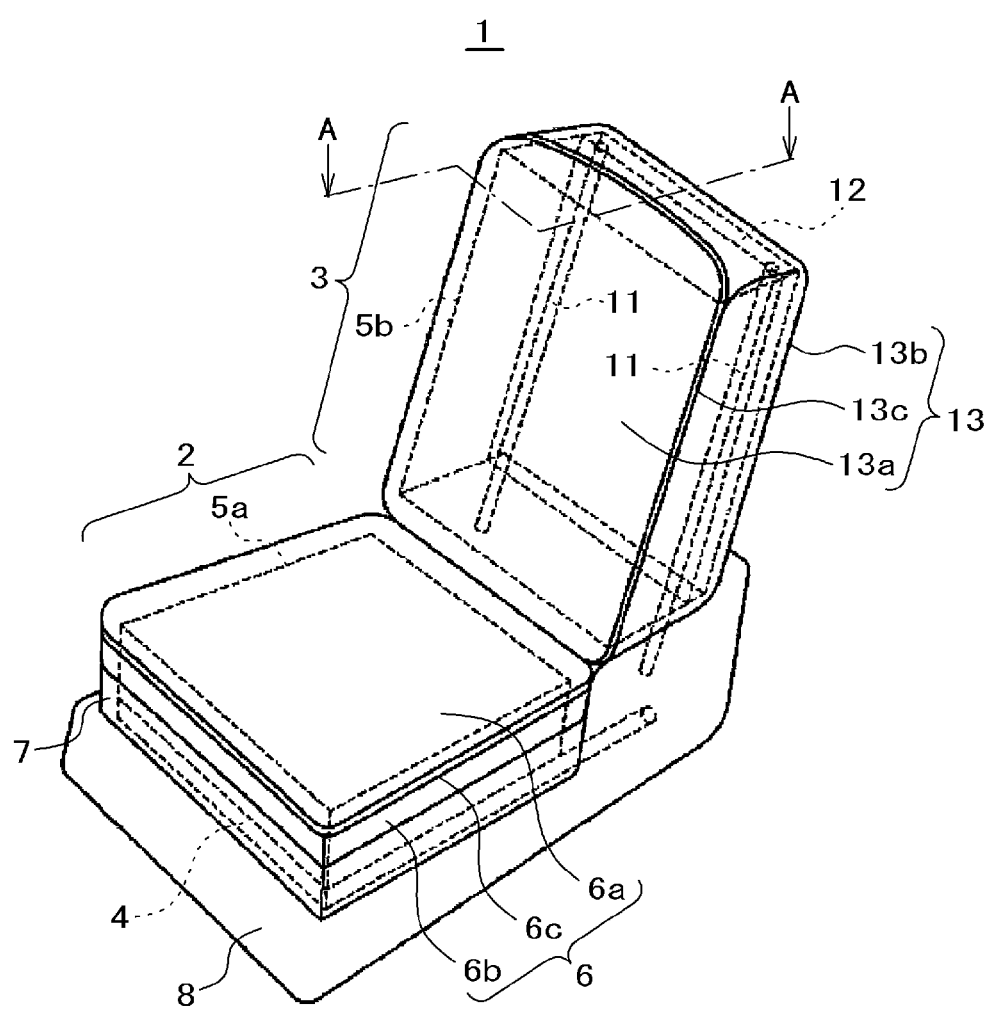
FIG. 17 is a perspective view of a seat for vehicle according to a second embodiment.

FIG. 17 is a perspective view of the seat for vehicle according to a second embodiment.

The seat 1 for vehicle includes the seat cushion 2 on which the occupant is seated, and the seat back 3 on which the seated occupant leans.

The seat cushion 2 includes the frame 4 as the skeleton structure, a pad 5*a* fixed to the frame 4, the skin 6 for covering the pad 5*a*, a side cover 7 for covering the side surface of the frame 4, and the frame cover 8 for covering the lower part of the frame 4. The frame 4 is made of the material with high rigidity, for example, steel, rigid synthetic resin and the like. The pad 5*a* is a member which offers cushioning property to the seated occupant, and made of foamable resin such as urethane.

The skin 6 includes the first skin part 6*a* and the second skin part 6*b*. The first skin part 6*a* is shaped to have a part in contact with at least the buttock of the occupant to be seated, which may have substantially the same shape as the upper surface of the pad 5*a*. The second skin part 6*b* includes a side part for covering at least the front, left and right parts of the pad 5*a*, a joint part sewn with the first skin part 6*a*, and a connection part which has the protruding member to be described later, and is folded inward from the front, left and right sides.

The end of the first skin part 6*a* and the connection part of the second skin part 6*b* are sewn and joined along the seam 6*c* as the joint part by using the sewing thread. They are sewn together so that the seam 6*c* is hidden inside the first and the second skin parts for improving the aesthetic appearance.

The first skin part 6*a* may be made of leather, synthetic leather, fabric, equivalents thereof, or the member derived from combining those materials. The second skin part 6*b* may be made of soft material, for example, elastomer, soft resin, formed nonwoven fabric, equivalents thereof, or the material derived from arbitrary combination thereof. The elastomer may be a rubber-like industrial material which exhibits elasticity, for example, the olefin-based thermoplastic elastomer. The side cover 7 and the frame cover 8 which are made of synthetic resin are formed through the resin molding process.

The seat back 3 includes the pipe frame 11 as the skeleton structure, the backboard 12 supported by the pipe frame 11, the pad 5b fixed to the backboard 12, and the skin 13 for covering the pad 5b. The pipe frame 11 is swingably linked with the frame 4 at the side of the seat cushion 2 by a not shown reclining mechanism. The pipe frame 11 is made of steel. The backboard 12 is made of rigid synthetic resin. The pad 5b is a member which offers cushioning property to the seated occupant, and made of foamable resin such as urethane.

The skin 13 includes the first skin part 13a and the second skin part 13b. The end of the first skin part 13a and the connection part of the second skin part 13b are sewn and joined along the seam 13c as the joint part by using the sewing thread. The sewing is performed to make the seam 13c hidden inside the first and the second skin parts for the purpose of improving aesthetic appearance.

The first skin part 13a may be made of leather, synthetic leather, fabric, equivalents thereof, or the member derived from combining those materials. The second skin part 13b may be made of soft material, for example, elastomer, soft resin, formed nonwoven fabric, equivalents thereof, or the material derived from arbitrary combination thereof. This allows the first skin part 13a and the second skin part 13b to be sewn together by the sewing machine.

Figure 18:
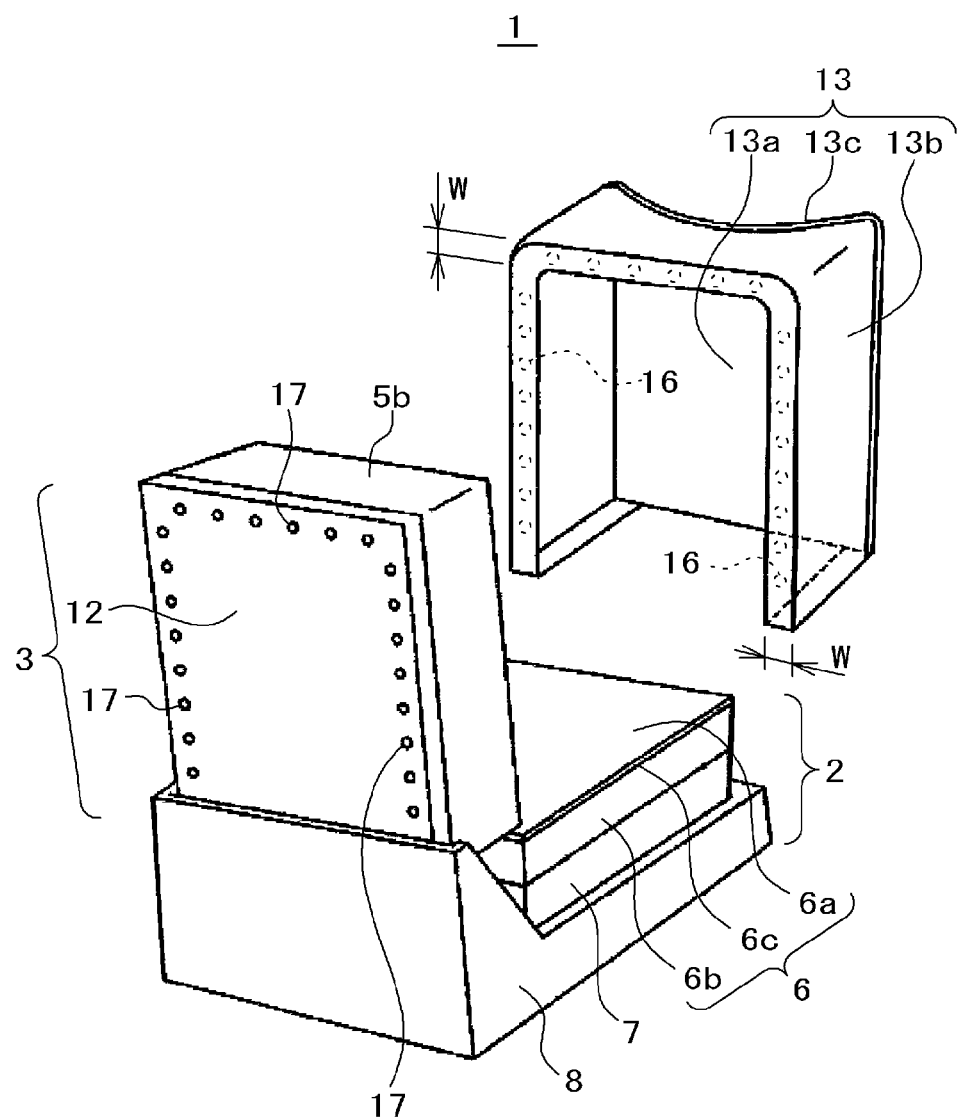
FIG. 18 is an exploded perspective view of the seat for vehicle as shown in FIG. 17, illustrating the state where the skin is removed from the seat.
Figure 19:
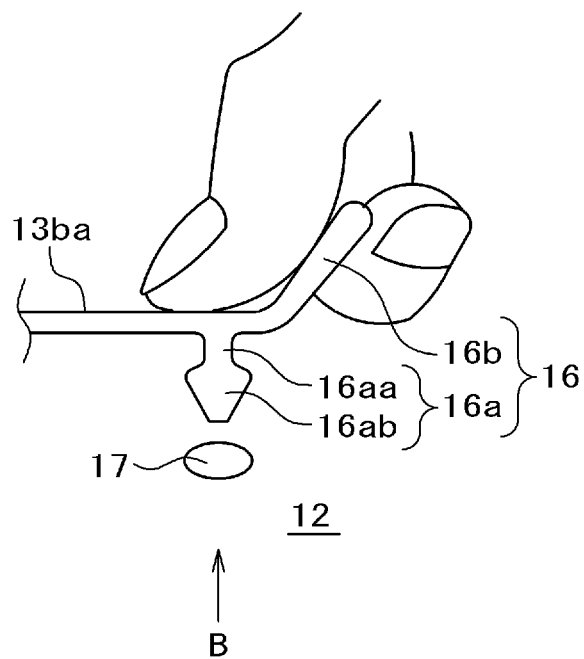
FIG. 19 is an explanatory view of a connection structure according to the second embodiment.
Figure 20:
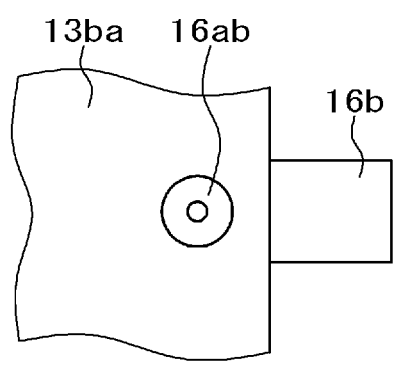
FIG. 20 is a plan view of a protruding member as shown in FIG. 19 when seen from direction B.

FIG. 18 is an exploded perspective view of the seat for vehicle as shown in FIG. 17, illustrating the state where the skin is removed from the seat when seen from the back side. FIG. 19 is an explanatory view of the connection structure according to the embodiment. FIG. 20 is a plan view of the connection structure as shown in FIG. 19 in a plan view.

The surface of the second skin part 13b, opposite to the seam 13c is folded back inward with a predetermined width (W). A resultant fold-back portion 13ba includes a plurality of protruding members 16. The same material is used for forming the protruding members 16 and the second skin part 13b which are integrally produced in manufacturing of the second skin part 13b simultaneously through the molding process.

As FIG. 19 shows, the protruding member 16 includes the insertion part 16a protruding inward of the second skin part 13b (backboard 12), and the knob 16b protruding from an end of the fold-back portion 13ba of the second skin part 13b. The insertion part 16a includes the shaft portion 16aa, and the conical head portion 16ab as a large diameter part, which is formed on the tip end of the shaft portion. The large diameter part refers to the part having the diameter larger than that of the shaft portion 16aa.

As FIG. 18 shows, the plurality of holes 17 are formed around the peripheral edge of the back surface of the backboard 12. For example, 6 holes are formed at the upper part, and 8 holes are formed each at the left and the right sides of the backboard 12, respectively. The interval between the holes 17 is the same as the interval between the adjacent protruding members 16 formed on the second skin part 13b. As FIG. 19 shows, the diameter of the hole 17 is smaller than that of the head portion 16ab of the protruding member 16. Furthermore, the diameter of the hole 17 is determined so as to allow the head portion 16ab which has been pushed into the hole 17 with the predetermined pressure force to pass through the hole 17 while being elastically deformed. The hole 17 may have a circular shape in a plan view, for example.

The skin 13 is covered over the integrated structure of the backboard 12 and the pad 5b, and each of the head portions 16ab of the protruding member 16 of the second ski part 13b is inserted into the corresponding hole 17 of the backboard 12 with the predetermined pressure force so that the respective protruding members 16 are engaged or fitted with the corresponding holes 17. The engagement allows the skin 13 to be applied in tight contact with the surface of the integrated structure of the backboard 12 and the pad 5b so that assembly of the seat 1 for vehicle is completed. In the embodiment, the connection structure for connecting the backboard 12 as the substrate and the second skin part 13b is constituted by the protruding members 16 disposed on the second skin part 13b and the holes 17 formed in the backboard 12 as the substrate.

The head portion 16b of the protruding member 16 is pushed into the hole 17 formed around the peripheral edge of the backboard 12. As the diameter of the head portion 16ab is larger than that of the hole 17, the pushed head portion 16ab cannot be easily slipped off from the hole 17.

For disengaging operation, the knob 16b is pulled outward (direction opposite to the backboard 12) so that the head portion 16ab is slipped off from the hole 17 for disengagement.

According to the second embodiment, the hole formed in the substrate is fitted with the protruding member made of soft material such as elastomer, which allows the occupant to perform one-handed operation for attachment or detachment by simply operating the integrally formed knob adjacent to the protruding member with less force. The knob is adjacent to the protruding member for fitting operation, which may be a mark indicating the fitting position. As the ball of the occupant's thumb is positioned corresponding to the back side of the protruding member for fitting while gripping the knob, the occupant is allowed to easily find out the fitting hole. It is therefore possible for the occupant to push the protruding member with the ball of the thumb while gripping the knob. The attachment and detachment operations may be performed more easily than the comparative example. As a result, damage to the insertion part or the backboard upon detachment may be prevented. As specific tool or a large operational force is not required, the detachment or attachment operation may be momentarily performed. This makes it possible to exchange the skin.

Referring to FIG. 17, the seat cushion 2 includes a skin end fixing structure similar to the one (connection structure) as described above. In other words, a plurality of protruding members similar to the protruding members 16 as shown in FIG. 20 are disposed on the inner surface of the second skin part 6b that constitutes the skin 6. Meanwhile, the hole similar to the hole 17 as shown in FIG. 19 is formed around the upper peripheral edge of the side cover 7 as shown in FIG. 17. The protruding member of the second skin part 6b is inserted into the hole of the side cover 7 as the substrate for connection between the second skin part 6b and the side cover 7.

MODIFIED EXAMPLE 2-1

Figure 21:
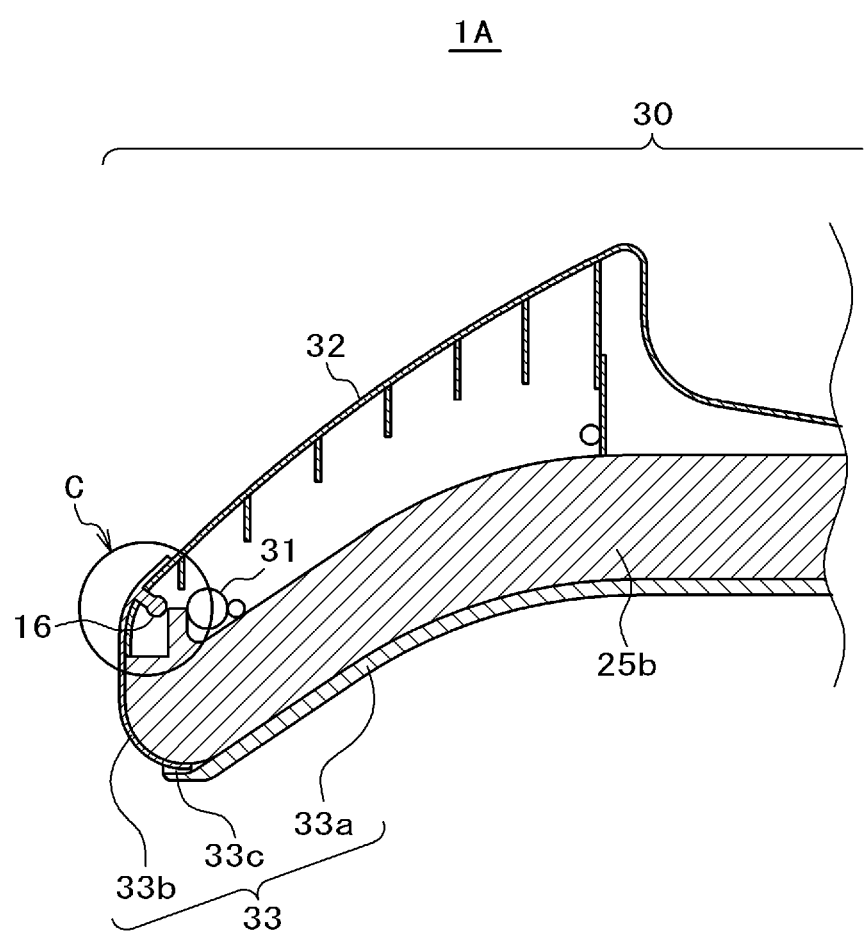
FIG. 21 is a sectional view of a part of the seat for vehicle according to a modified example 2-1.

A first modified example of the second embodiment will be described referring to FIG. 21. FIG. 21 is a sectional view illustrating a part of the seat for vehicle according to the modified example 2-1. FIG. 21 illustrates a part of a seat back 30 which constitutes a seat 1A for vehicle according to the modified example 2-1. This part corresponds to the plane section structure of the part taken along line A-A of FIG. 17.

The seat back 30 according to the modified example 2-1 includes a pipe frame 31 as the skeleton structure, a backboard 32 supported by the pipe frame 31, a pad 25b fixed to the backboard 32, and a skin 33 for covering the pad 25b. The pipe frame 31, the backboard 32, and the pad 25b are constituted by the members similar to those described in the second embodiment.

The skin 33 includes a first skin part 33a and a second skin part 33b. The first skin part 33a and the second skin part 33b are sewn and joined along a seam 33c as the joint part by using the sewing thread. The second skin part 33b does not have the definite folded back part with the predetermined width W as defined in the second embodiment shown in FIG. 19.

The first skin part 33a and the second skin part 33b are constituted by the respective members similar to the first skin part 13a and the second skin part 13b as described in the second embodiment. The shape from the side surface of the pad 25b to the backboard 32 has a gentle curved shape. The second skin part 33b is formed into the curved shape adapted to the curved side surfaces of the pad 25b and the backboard 32.

The part indicated by arrow C of FIG. 21 is the connection structure similar to the one described in the second embodiment as shown in FIG. 20. In other words, the circular hole 17 is formed in the side part of the backboard 32. The protruding member 16 is disposed around the peripheral edge of the second skin part 33b. The protruding member 16 includes the insertion part 16a protruding inward of the second skin part 13b (toward the backboard 12), and the knob 16b. The insertion portion 16a includes the shaft portion 16aa, and the conical head portion 16ab with large diameter, which is formed on the tip end of the shaft portion. The knob 16b extends from an end of the fold-back portion 13ba adjacent to the protruding member 16.

In the modified example 2-1, the protruding member 16 is not formed on the folded part of the second skin part 13b with the width W as described in the second embodiment shown in FIG. 19. The protruding member is disposed at the smoothly curved portion of the second skin part 33b. The insertion part 16a is laterally engaged with the side part of the backboard 32.

MODIFIED EXAMPLE 2-2

Figure 22:
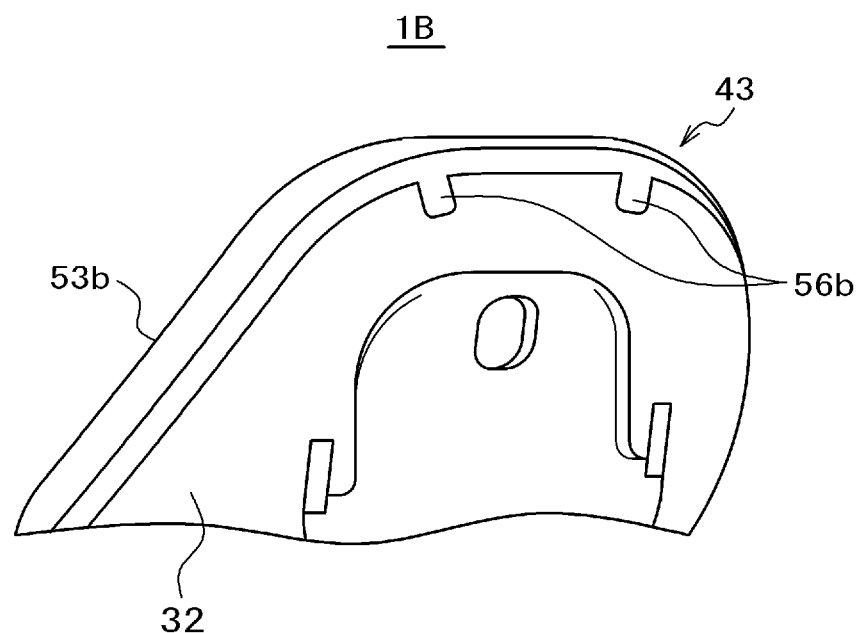
FIG. 22 is a perspective view illustrating a part of a seat back of the seat for vehicle according to a modified example 2-2.
Figure 23:
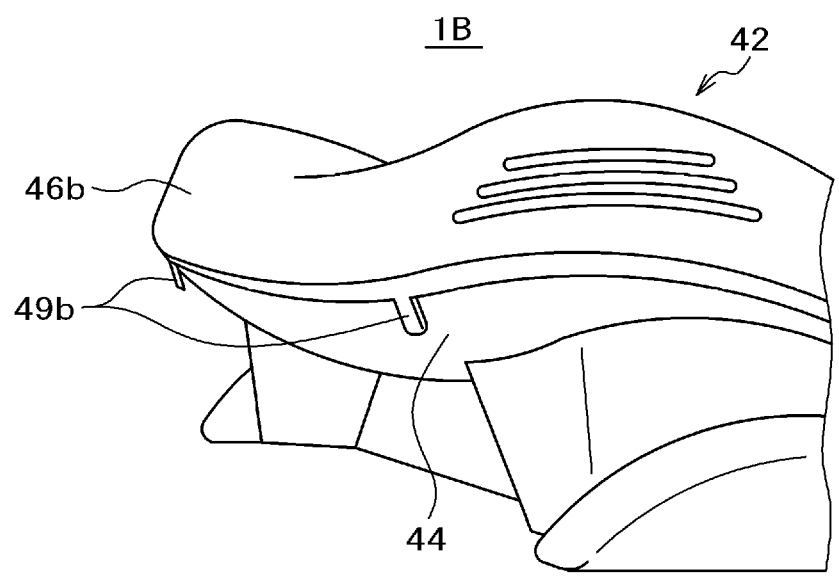
FIG. 23 is a perspective view illustrating a part of a seat cushion of the seat for vehicle according to the modified example 2-2.

A second modified example of the second embodiment will be described referring to FIGS. 22 to 26. FIG. 22 is a perspective view illustrating a part of the seat back of the seat for vehicle according to the modified example 2-2. FIG. 23 is a perspective view illustrating a part of the seat cushion of the seat for vehicle according to the modified example 2-2.

The seat 1B for vehicle includes a seat cushion 42 on which the occupant is seated, and a seat back 43 on which the seated occupant leans.

The seat back 43 includes a backboard 52, a pad (not shown) fixed to the backboard 52, and a skin (not shown) for covering the pad. The backboard 52 is made of rigid synthetic resin. The skin includes a first skin part (not shown) and a second skin part 53b. The first skin part and the second skin part 53b are sewn and joined along a seam (not shown) as the joint part by using the sewing thread. The first skin part and the second skin part 53b are constituted by the members similar to those used for forming the first skin part 13a and the second skin part 13b of the second embodiment, respectively.

The seat cushion 42 includes a cushion frame 44, a pad (not shown) fixed to the cushion frame 44, and a skin (not shown) for covering the pad. The skin includes a first skin part (not shown) and a second skin part 46b. The first skin part and the second skin part 46b are sewn and joined along a seam (not shown) as the joint part by using the sewing thread. The first skin part and the second skin part 46b are constituted by the members similar to those used for forming the first skin part 6a and the second skin part 6b of the second embodiment, respectively.

Figure 24:
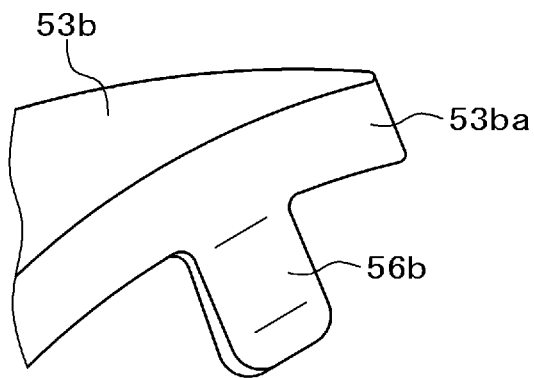
FIG. 24 is an explanatory view of a connection structure according to the modified example 2-2.
Figure 25:
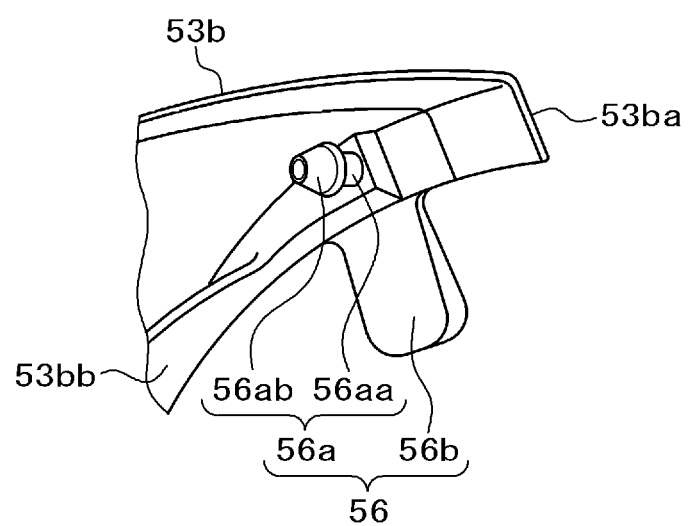
FIG. 25 is an explanatory view of the connection structure according to the modified example 2-2.
Figure 26:
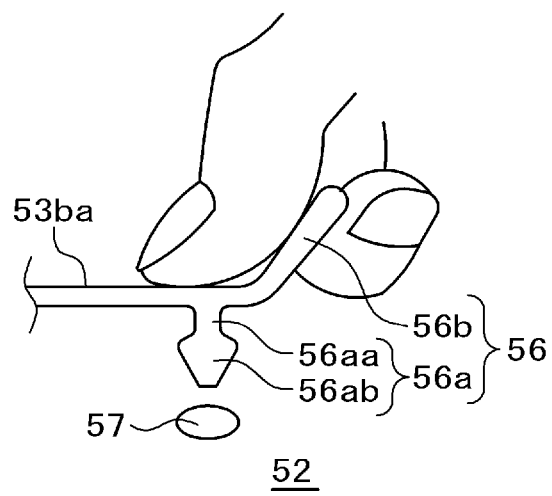
FIG. 26 is an explanatory view of the connection structure according to the modified example 2-2.

FIGS. 24 to 26 are views for explaining the connection structure according to the modified example 2-2.

The connection structure of the seat back 43 according to the modified example 2-2 is similar to the one as described in the second embodiment shown in FIG. 20. That is, a hole 57 is formed in a backboard 52. The hole 57 has a circular shape in a plan view, for example. A first fold-back portion 53ba which is folded back inward with the predetermined width is formed on the surface of the second skin part 53b, opposite to the seam. The first fold-back portion 53ba includes two protruding members 56. The same material is used for forming the protruding members 56 and the second skin part 53b which are integrally produced in manufacturing of the second skin part 53b simultaneously through the molding process.

The protruding member 56 includes an insertion part 56a extending to the inside of the second skin part 53b, and a knob 56b. The insertion part 56a includes a shaft portion 56aa, and a conical head portion 56ab formed on the tip end of the shaft portion. The knob 56b protrudes from the end of the first fold-back portion 53ba adjacent to the insertion part 56a. The second skin parts 53 has the protruding members 56 at two positions each corresponding to the upper part of the backboard 52. The second fold-back portion 53bb further folded back inward is disposed on the first fold-back portion 53ba corresponding to each of the left and right sides of the backboard 52.

The second fold-back portion 53bb is engaged with the side of the backboard 52, and the head portion 56ab of the protruding member 56 is inserted into the hole 57 formed around the upper peripheral edge of the backboard 52 so as to be connected to the second skin part 53b. As the number of the protruding members 56 is smaller than that of the second embodiment, the skin 53 may be applied more easily than the second embodiment. The skin may be detached by pulling the knob 56b outward (direction opposite to the backboard 52) so that the head portion 56ab is slipped off from the hole 57. As the number of the protruding members 56 is smaller than the second embodiment, the skin part 53 may be detached more easily than the second embodiment.

The connection structure of the seat cushion 42 according to the modified example 2-2 is similar to that of the seat back 43. Specifically, the cushion frame 44 has the hole similar to the hole 57. The surface of the second skin part 46b opposite to the seam has the first fold-back portion similar to the first fold-back portion 53ba. The first fold-back portion includes two protruding members similar to the protruding members 56. The second skin part 46 has the protruding members disposed at two positions each corresponding to the front part of the cushion frame 44. The second fold-back portions similar to the second fold-back portions 53bb are disposed on the parts corresponding to the left and right sides of the cushion frame 44.

The second fold-back portion is engaged with the side of the cushion frame 44, and the head portion of the protruding member is inserted into the hole formed around the front peripheral edge of the cushion frame 44 so as to be connected to the second skin part 46b. The skin part may be detached by pulling the knob 49b outward (direction opposite to the cushion frame 44) so that the head portion of the protruding member is slipped off from the hole for disengagement.

Third Embodiment

The seat for vehicle according to a third embodiment is configured to sew and join the trim cover for covering the surface of the cushion pad of the seat back, and the resin part made of flexible resin for covering the side surface of the cushion pad, and engage the resin part with the backboard on the surface of the backboard of the seat back in contact with the cushion seat, and the surface corresponding to the side surface of the cushion pad for fixation.

The third embodiment is configured to assemble the seat for vehicle while having the seat cushion assembled with the base seat. The assembly work is performed by engaging the hook or the protrusion formed on the resin part with the hook or the protrusion formed on the backboard by inserting the resin part of the cover into the contact portion between the seat cushion and the base seat, and connecting the cover and the base seat by bringing the concavo-convex part formed on the resin part of the cover in mesh with the concavo-convex part formed on the side surface of the backboard for engagement.

Figure 27:
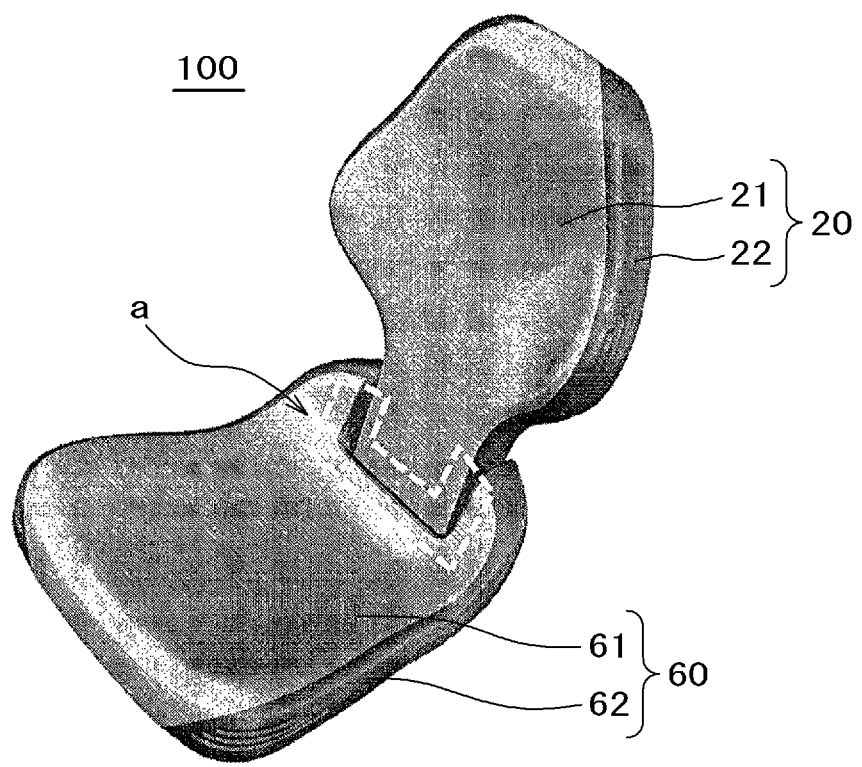
FIG. 27 is a perspective view of a seat for vehicle according to a third embodiment.

FIG. 27 illustrates the structure of a seat 100 for vehicle according to the third embodiment. The seat 100 for vehicle includes a seat cushion 60 on which the occupant is seated, and a seat back 20 on which the occupant seated on the seat cushion 60 leans. Additionally, a not shown head rest may be disposed above the seat back 20.

The surface of the seat cushion 60, on which the occupant is seated is covered with a trim cover 61. The side surface of the seat cushion is made of a flexible resin part 62 (for example, olefin-based thermoplastic elastomer) 12. Likewise, the surface of the seat back 20, on which the occupant leans is covered with a trim cover 21. The side surface of the seat back is constituted by a resin part 22 made of flexible resin. The trim cover 61 and the resin part 62, and the trim cover 21 and the resin part 22 are sewn and joined together, respectively.

Figure 28:
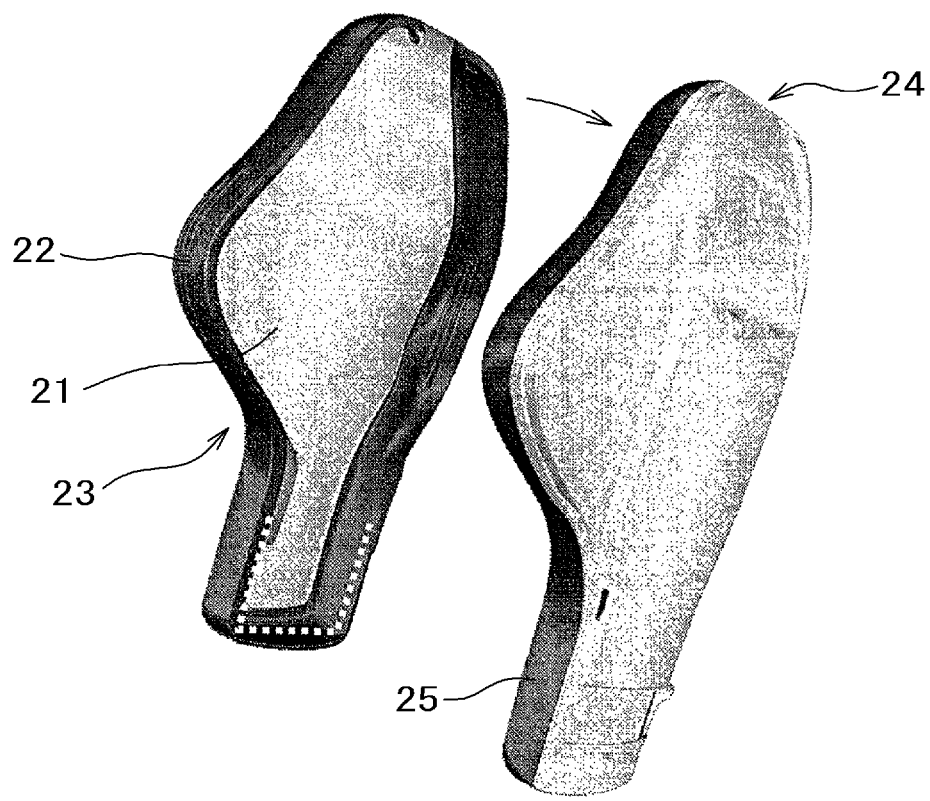
FIG. 28 is a perspective view illustrating a seat back structure of the seat for vehicle according to the third embodiment.

FIG. 28 illustrates the structure of the seat back 20. The seat back 20 is mainly formed of a base cover 23 including the trim cover 21 and the resin part 22, and a base seat 24. The seat back 20 is assembled by covering a side part 25 formed around the base seat 24 with the resin part 22 formed around the side part of the base cover 23.

Figure 29:
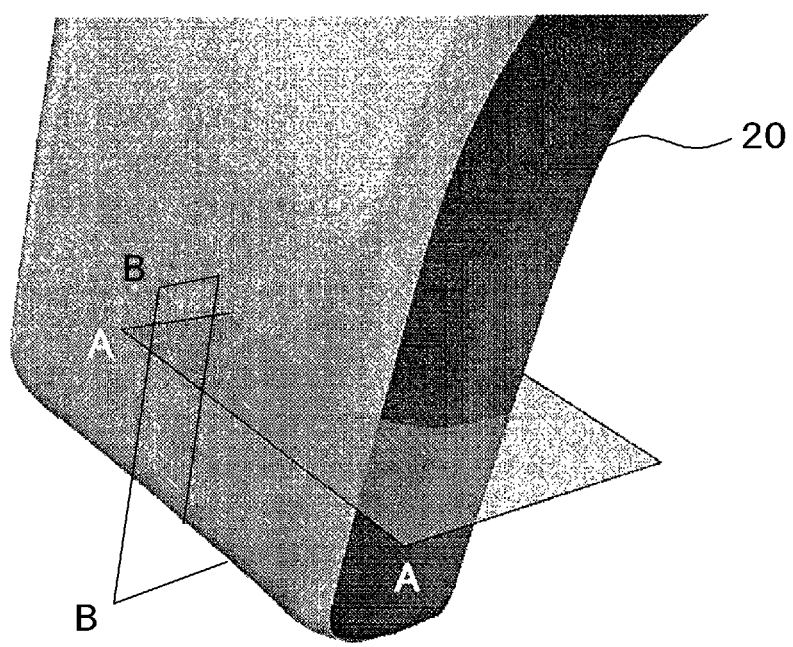
FIG. 29 is a perspective view illustrating a shape of the seat back of the seat for vehicle according to the third embodiment, which is in contact with the seat cushion.

FIG. 29 is a perspective view corresponding to the part enclosed with the frame a shown in FIG. 27, illustrating the seat back 20 close to the seat cushion 60, which is assembled by fitting the side part 25 formed around the base seat 24 with the resin part 22 formed around the side part of the base cover 23. FIG. 4 shows the cross section structure of the section taken along line A-A of FIG. 29.

Figure 30:
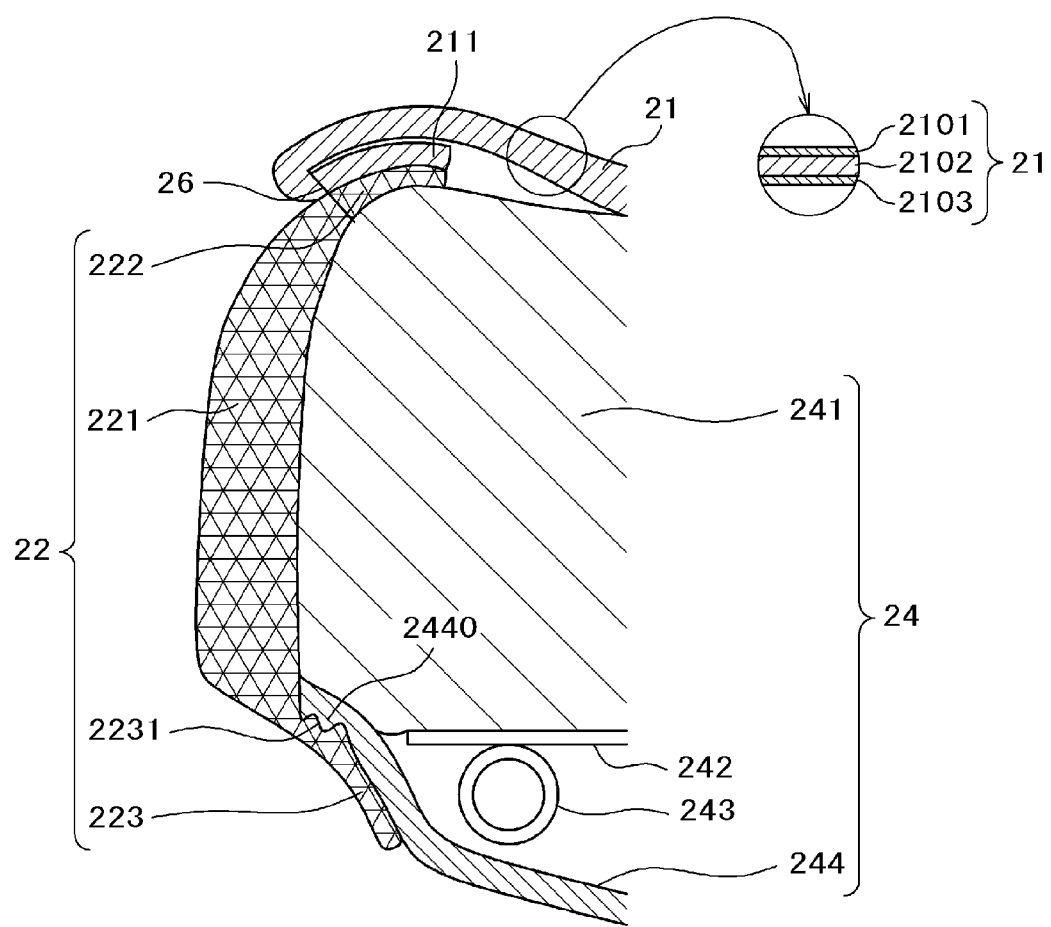
FIG. 30 is a sectional view of the seat back of the seat for vehicle according to the third embodiment, taken along line A-A of FIG. 29.

Referring to FIG. 30, the base seat 24 includes a urethane pad 241 as the cushion pad, a back plate 242 for holding the back surface of the urethane pad 241, a frame 243 for supporting the base seat 24, and a backboard 244 for covering the back surface side of the urethane pad 241.

The trim cover 21 and the resin part 22 which constitute the base cover 23 covers the surface of the urethane pad 241 of the base seat 24. A part 221 of the resin part 22, which covers the side surface of the urethane pad 241 is configured to have a large thickness, and relatively higher rigidity.

Meanwhile, each of end parts 222 and 223 of the resin part 22 has a relatively small thickness, and flexibility.

Referring to the cross section of FIG. 30, the relatively thin section of the resin part at the end part 222 is overlapped with a tip end part 211 of the trim cover 21, and sewn at a point 26 for integrating the resin part 22 and the trim cover 21. It is difficult for the thick and rigid part of the resin part 22 such as the part 221 for covering the side of the urethane pad 241 to be sewn with the trim cover 21. However, the section of the resin part, having its thickness reduced such as the end part 222 may be easily sewn with the trim cover 21.

The trim cover 21 sewn with the end part 222 of the resin part 22 is folded back at the sewing point 26 so that a skin 2101 is at the side in contact with the back of the seated occupant, and a back base fabric 2103 is at the side in contact with the urethane pad 241 having an intermediate cover pad 2102 interposed therebetween.

Referring to the sectional view of FIG. 30, a wave-like concavo-convex part 2231 is formed on the surface of the other relatively thin end part 223 of the resin part 22. The similar wave-like concavo-convex part 2440 is formed on the end of the backboard 244 of the base seat 24. The concavo-convex part 2231 formed at the end part 223 is engaged with the concavo-convex part 2440 formed at the end of the back board 244 by pulling the end part 223 of the resin part 22 toward the end of the backboard 244 while the resin part 22 is kept abutted on the cushion pad 241. The concavo-convex part 2231 may be kept in mesh with the concavo-convex part 2440 by releasing the tension applied to the end part 223 of the resin part 22.

The state of mesh between the concavo-convex part 2231 at the end part 223 of the resin part 22 and the concavo-convex part 2440 at the end of the backboard 244 ensures to hold the base cover 23 on the side surface of the base seat 24.

Figure 31:
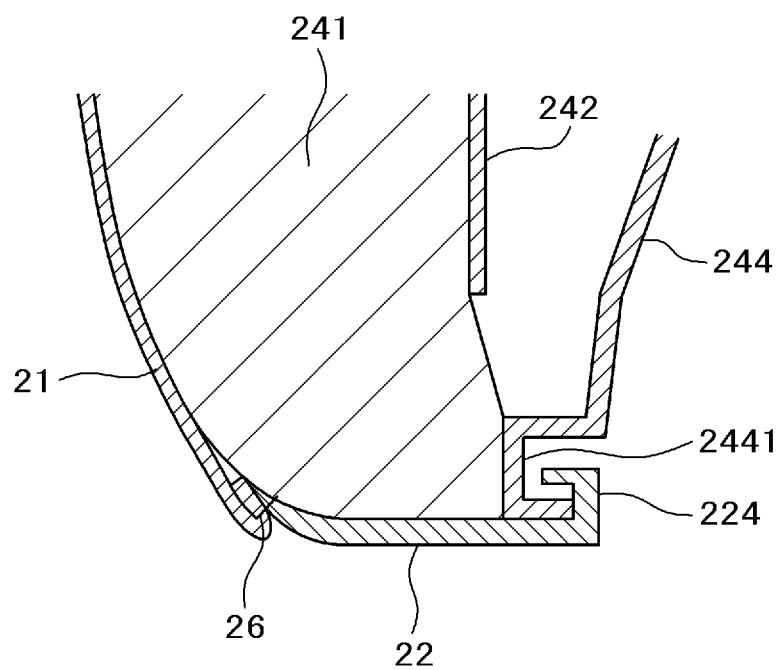
FIG. 31 is a sectional view of the seat back of the seat for vehicle according to the third embodiment, taken along line B-B of FIG. 29.

FIG. 31 shows the cross section of the structure of the seat back 20 around the lower end part, taken along line B-B of FIG. 29.

In the third embodiment, a hook 2441 is formed at the end of the backboard 244 at the lower end of the seat back 20 (the side in contact with the seat cushion 60). A hook 224 is formed at the end of the resin part 22.

The hook 224 at the end of the resin part 22 is engaged with the hook 2441 at the end of the backboard 244 as shown in FIG. 31 so as to securely fix the hook 224 at the end of the resin part 22 to the hook 2441 at the tip end of the backboard 244 without causing disengagement.

Figure 32A:
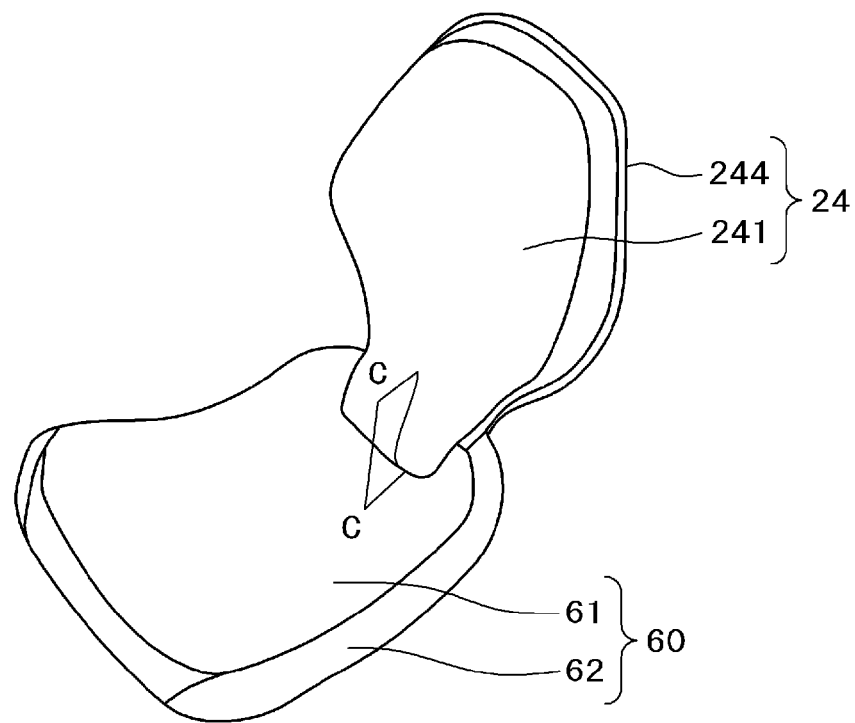
FIG. 32A is perspective view representing a state where a base seat is assembled with the seat cushion of the seat for vehicle according to the third embodiment.
Figure 32B:
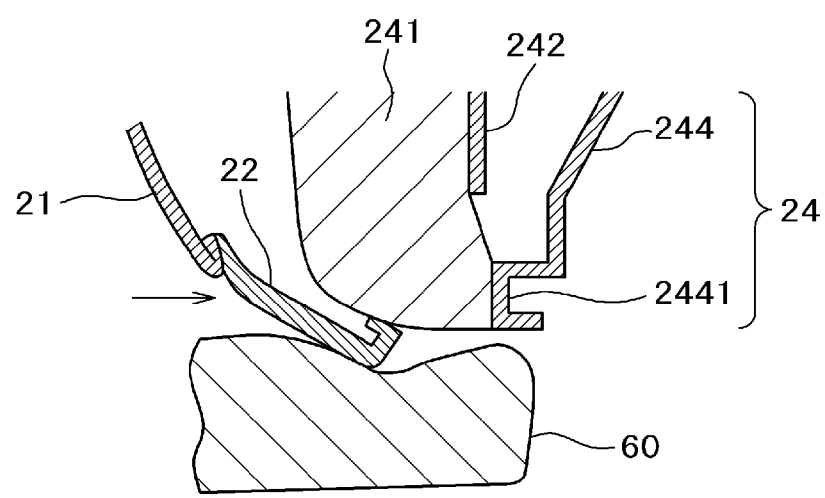
FIG. 32B is a sectional view taken along line C-C of FIG. 32A, illustrating the state where a hook at a tip end of a base cover is inserted into a gap of the base seat assembled with the seat cushion of the seat for vehicle according to the third embodiment.
Figure 32C:
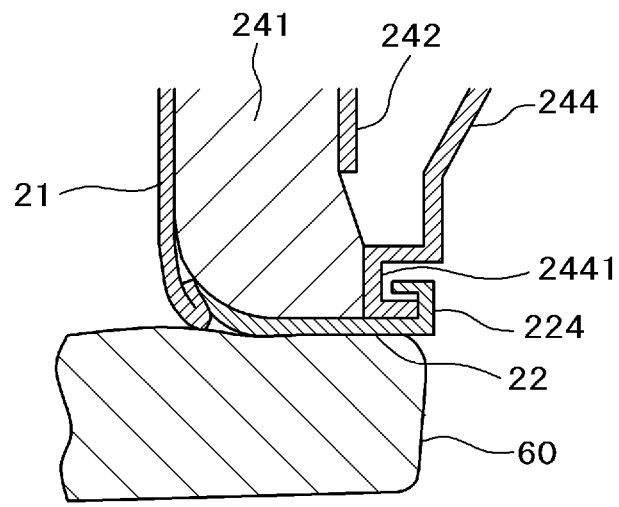
FIG. 32C is a sectional view taken along line C-C of FIG. 32A, illustrating a connection state between the hook at the tip end of the base cover inserted from the gap of the base seat assembled with the seat cushion of the seat for vehicle according to the third embodiment, and a hook formed at the tip end of a backboard through hooking.

FIGS. 32A to 32C represent the procedure of assembling the base cover 23 having the resin part 22 provided with the hook part with the base seat 24 having the hook 2441 disposed at the end of the backboard 244.

In the state where the base seat 24 is assembled with the seat cushion 60 as shown in FIG. 32A, the hook 224 at the end of the resin part 22 of the base cover 23 is inserted into the gap between the base seat 24 and the seat cushion 60 as indicated by FIG. 32B, taken along line C-C of FIG. 32A.

As FIG. 32C shows, the end of the resin part 22 is further pushed so that the hook 224 at the end of the resin part 22 is hooked on the hook 2441 formed at the end of the backboard 244 of the base seat 24 (hooks are in mesh with each other).

The end part 223 of the resin part 22 of the base cover 23 is pulled toward the base seat 24 so that the wave-like concavo-convex part 2231 formed at the end part 223 is hooked on the wave-like concavo-convex part 2440 formed at the end of the backboard 244 of the base seat 24. The wave-like concavo-convex part 2231 of the resin part 22 and the wave-like concavo-convex part 2440 of the backboard 244 which have been once in mesh with each other are rarely separated by the force simply derived from pulling from both sides. This makes it possible to securely fix the base cover 23 to the base seat 24.

The third embodiment is configured to allow the base cover 23 to be securely fixed to the base seat 24 easily at the side surface and lower surface sections around the lower end of the seat back 20.

MODIFIED EXAMPLE 3-1

The first modified example of the third embodiment employs a round bar 224-1 at the end of the resin part 22 in contact with the seat cushion 60 in place of the hook 224 formed at the end of the resin part 22 in contact with the seat cushion 60 as described in the third embodiment. The hook 2441 is formed at the end of the backboard 244 likewise the third embodiment.

Figure 33:
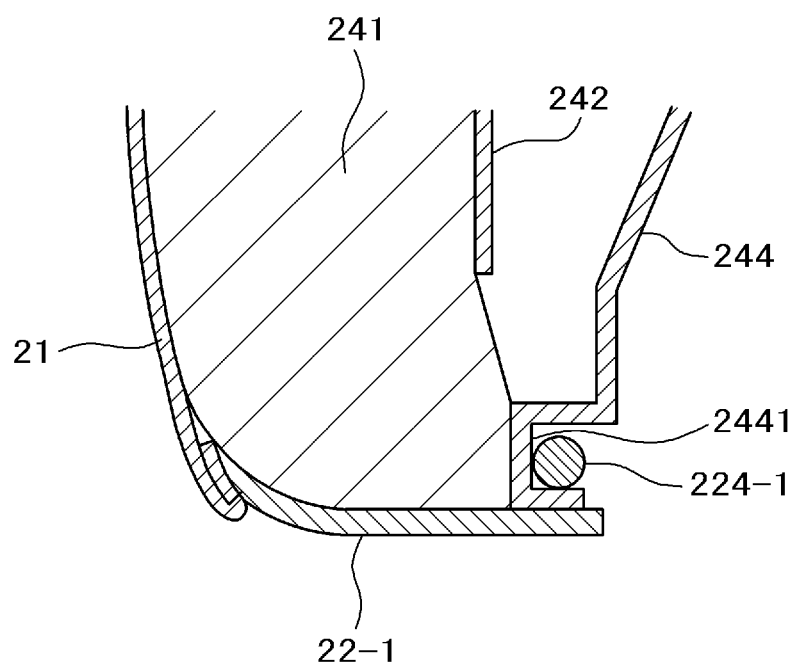
FIG. 33 is a sectional view of the surface of the seat back of the seat for vehicle according to a modified example 3-1, corresponding to the surface taken along line B-B of FIG. 29.

FIG. 33 is a sectional view showing the state where the round bar 224-1 at the end of the resin part 22-1 is engaged with the hook 2441 formed at the end of the backboard 244 according to the modified example 3-1. The round bar 224-1 has its both ends fixed to the end of the resin part 22-1 and supported thereby.

The procedure of assembling the base cover 23 having the round bar 224-1 fixed to the end of the resin part 22-1 with the base seat 24 having the hook 2441 formed at the end of the backboard 244 is the same as the one described in the third embodiment referring to FIGS. 32A to 32C. The explanation of the procedure, thus will be omitted.

An alternative to the hook 224 is not limited to the aforementioned example of the round bar 224-1, which may be modified in various ways so as not to deviate from the scope of the invention. Specifically, the alternative may be an arbitrary member so long as its inner diameter is smaller than that of the hook 2441. For example, the member with polygonal shape such as rectangle is available without being limited to the round bar.

MODIFIED EXAMPLE 3-2

Figure 34A:
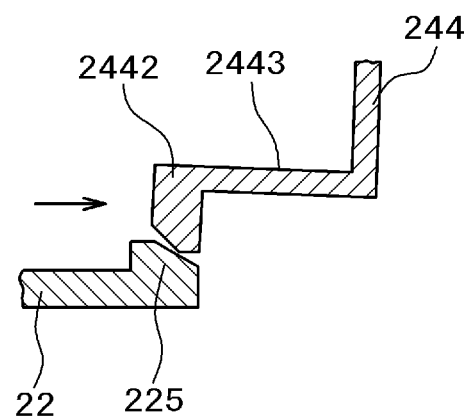
FIG. 34A is a sectional view of protrusions in a mesh state where the base cover is inserted from a gap of the base seat assembled with the seat cushion of the seat for vehicle while allowing its protrusion at the tip end to push up the protrusion at the tip end of the backboard according to a modified example 3-2.

The second modified example of the third embodiment will be described. It is configured to employ a tapered protrusion 225 formed at the tip end of the resin part 22 as shown in FIG. 34A in place of the structure shown as the cross section of FIG. 31 around the lower end of the seat back 20. The tip end of the facing backboard 244 includes an L-like protrusion 2442.

Referring to FIG. 34A, in the structure according to the modified example 3-2, the tapered protrusion 225 at the tip end of the resin part 22 is pushed toward the arrow direction against the L-like protrusion 2442 at the tip end of the backboard 244. At this time, although the L-like protrusion 2442 at the tip end of the backboard 244 is pushed up by the tapered protrusion 225 at the tip end of the resin part 22, upward deflection of an arm 2443 will release the protrusion.

Figure 34B:
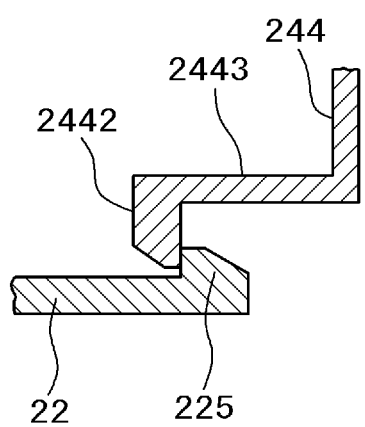
FIG. 34B is a sectional view of protrusions in an engaged state between the protrusion at the tip end of the base cover inserted from the gap of the base seat assembled with the seat cushion of the seat for vehicle, and the protrusion at the tip end of the backboard according to the modified example 3-2.

Upon pushing of the tapered protrusion 225 at the tip end of the resin part 22 in the arrow direction against the L-like protrusion 2442 at the tip end of the backboard 244, the L-like protrusion 2442 at the tip end of the backboard 244 will get over the tapered protrusion 225 at the tip of the resin part 22 so that the respective protrusions are brought in mesh with each other as shown in FIG. 34B. In the aforementioned state, at a time when the tapered protrusion 225 at the tip end of the resin part 22 stops advancing, the mesh state between the protrusions cannot be easily released even if the resin part 22 is pulled in the opposite direction.

According to the modified example 3-2, once the tapered protrusion 225 at the tip end of the resin part 22 is in mesh with the L-like protrusion 2442 at the tip end of the backboard 244 through the relatively simple configuration, such mesh state will be hardly released by simply pulling. This makes it possible to ensure engagement between the tapered protrusion 225 at the tip end of the resin part 22, and the L-like protrusion 2442 at the tip end of the backboard 244.

The modified example 3-2 securely fixes the base cover 23 to the base seat 24 at the side surface and the lower surface parts easily around the lower end of the seat back 20.

MODIFIED EXAMPLE 3-3

According to a third modified example of the third embodiment, the cross section structure of the seat back 20 around the lower end of the seat back 20 is formed to have the protrusion 2443 at the tip end 2442 of the backboard 244. Meanwhile, a tip end 226 of the facing resin part 22 includes a hole part 2260 as shown in FIG. 36 taken along line D-D of FIG. 35. The hole part 2260 includes a hole 2261 with diameter larger than the diameter of a head portion 24431 of the protrusion 2443, and a groove 2262 with the same width as the diameter of the shaft portion 24432 of the protrusion 2443 which extends toward the end surface side 2261 of the end part 226.

Figure 35:
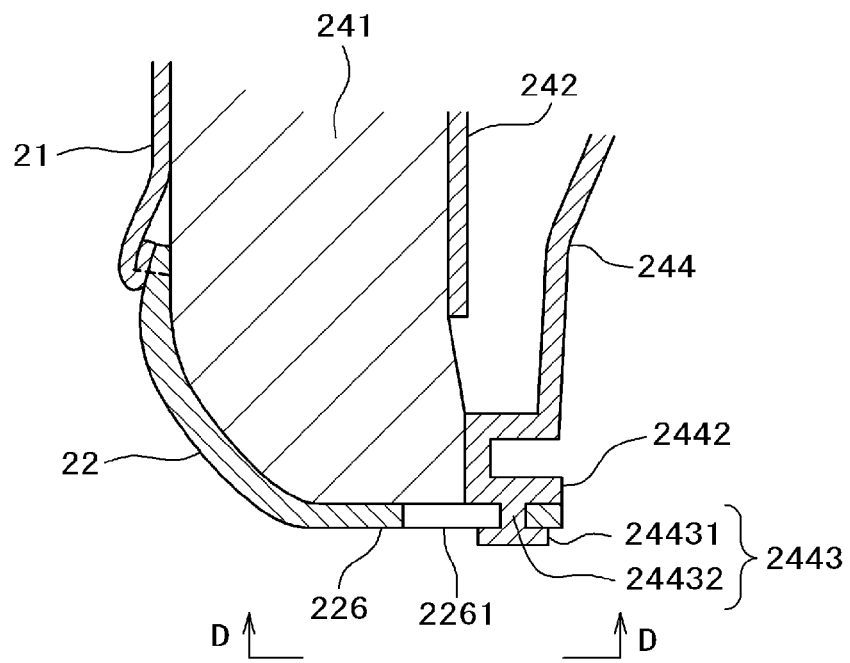
FIG. 35 is a sectional view of a surface of the seat back corresponding to the section taken along line A-A of FIG. 29, representing connection between the protrusion formed around the tip end of the backboard, and the hole formed in the tip end of the base cover through hooking on the seat back of the seat for vehicle according to a modified example 3-3.
Figure 36:
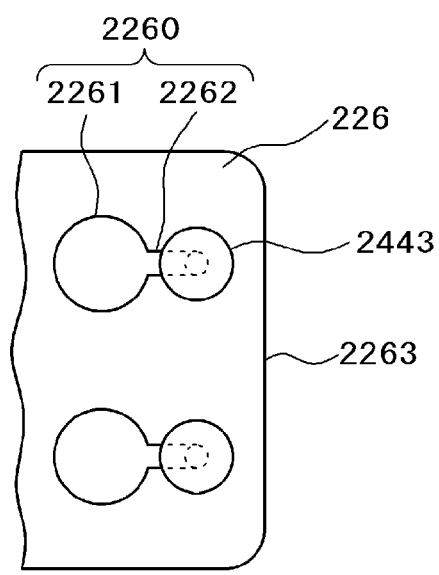
FIG. 36 is a fragmentary view of the seat back of the seat for vehicle according to the modified example 3-3, taken along line D-D of FIG. 35.

As the resin part 22 is extensively pushed from the left to the right side as shown in FIG. 35 while having a tip end 2263 directed downward, the tip end 2263 is allowed to get over the head portion 24431 of the protrusion 2443 at the tip end 2442 of the backboard 244. The resin part is further pushed until the head portion 24431 protrudes from the hole 2261 of the hole part 2260 formed in the end part 226 of the resin part 22.

As the resin part 22 is returned from the right to the left side with respect to the backboard 244, the shaft portion 24432 of the protrusion 2443 is caught by the groove 2262. In this state, the resin part 22 may hardly be slipped off from the backboard 244 easily.

According to the modified example 3-3, once the protrusion at the tip end 226 of the resin part 22 is fitted with the hole part 2260 formed in the tip end 2442 of the backboard 244, the engagement state cannot be easily released just by pulling. This makes it possible to securely engage the hole part 2260 at the tip end 226 of the resin part 22 with the protrusion 2243 at the tip end 2442 of the backboard 244.

The modified example 3-3 allows the base cover 23 to be securely fixed to the base seat 24 easily at the side surface and the lower surface parts around the lower end of the seat back 20.

The first embodiment (including modified examples 1-1, 1-2) may be appropriately combined with the second embodiment (including modified examples 2-1, 2-2). For example, it is possible to assemble the seat back according to the first embodiment with the seat cushion according to the second embodiment into the seat for vehicle. It is also possible to produce the seat back or the seat cushion by combining a part of the structure according to the first embodiment with a part of the structure according to the second embodiment. It is possible to appropriately combine the first embodiment (including modified examples 1-1, 1-2) with the third embodiment (including modified examples 3-1, 3-2, 3-3). For example, it is possible to assemble the seat back according to the third embodiment with the seat cushion according to the first embodiment into the seat for vehicle. It is possible to produce the seat back or the seat cushion by combining a part of the structure according to the first embodiment with a part of the structure according to the third embodiment. It is possible to appropriately combine the second embodiment (including modified examples 2-1, 2-2) with the third embodiment (including modified examples 3-1, 3-2, 3-3). For example, it is possible to assemble the seat back according to the third embodiment with the seat cushion according to the second embodiment into the seat for vehicle. It is possible to produce the seat back or the seat cushion by combining a part of the structure according to the second embodiment with a part of the structure according to the third embodiment. It is possible to appropriately combine the first embodiment (including modified examples 1-1, 1-2), the second embodiment (including modified examples 2-1, 2-2), and the third embodiment (including modified examples 3-1, 3-2, 3-3). For example, it is possible to produce the seat back or the seat cushion by combining each part of the structures according to the first, the second, and the third embodiments.

The present invention has been described in detail based on the embodiments and the modified examples. It is to be understood that the present invention is not limited to those embodiments and the modified examples, but may further be modified in various forms. The structure having its part as described in the embodiments and the modified examples replaced with arbitrary means having equivalent function, or having its part with no practicability omitted may also be considered to be within the scope of the present invention.

For example, in the first and the second embodiments, the substrate to which the skin 13 is applied is constituted by the backboard 12 supported by the pipe frame 11. It is possible to allow the pipe frame 11 by itself to serve as the substrate. Furthermore, the substrate may be constituted by the backboard which functions as the frame in the form of the skeleton structure without requiring the support by the pipe frame 11.

In the first and the second embodiments, the member for forming the skin for the seat back is different from the one for forming the skin for the seat cushion. However, it is possible to use the member for integrally forming those skins. In the state where the first skin parts 6a, 13a are integrally formed or sewn together into the single part, it is preferable to form the second skin part 6b and the second skin part 13b each as the separate body for improving assembly workability.

It is possible to form the relief-like slit formed in the second skin part 13b according to the first embodiment in the seat for vehicle according to the comparative example, and the modified examples 1-1 and 1-2.

In the modified example 2-1, the substrate to which the skin 33 is applied is constituted by the backboard 32 supported by the pipe frame 31. It is also possible to constitute the substrate by the backboard serving as the frame in the form of the skeleton structure by itself without requiring support of the pipe frame 31.

Preferred Mode of the Invention

Preferred modes of the present invention will be added as follows.
1. In accordance with an aspect of the present invention, a seat for vehicle includes a seat cushion on which the occupant is seated, and a seat back on which the occupant seated on the seat cushion leans. The seat back includes a base seat provided with a backboard having a cushion pad and a backboard for covering the back surface of the cushion pad, and a cover constituted by a trim cover for covering the surface of the cushion pad of the base seat, on which the occupant leans, and a resin part made of flexible resin for covering the side surface of the cushion pad. The trim cover and the resin part of the cover are sewn and joined together. The resin part of the cover and the backboard of the base seat are engaged for connection at the surface of the backboard in contact with the seat cushion, and the surface corresponding to the side surface of the cushion pad.
2. In the seat for vehicle as described in the mode 1, preferably, the resin part of the cover has a section engaged with the backboard thinner than the section for covering the side surface of the cushion pad.
3. In the seat for vehicle as described in the mode 2, preferably, the resin part of the cover and the backboard of the base seat are connected by engaging the hook formed on the surface of the backboard in contact with the cushion seat with the hook corresponding to the one formed on the resin part.
4. In the seat for vehicle as described in the mode 2, preferably, the resin part of the cover and the backboard of the base seat are connected by engaging the protrusion formed on the surface of the backboard in contact with the cushion seat with the hole corresponding to the protrusion of the resin part.
5. In the seat for vehicle as described in the mode 3 or 4, preferably, the resin part of the cover and the backboard of the base seat are connected by engaging the concavo-convex part formed on the resin part with the concavo-convex part formed on the backboard on the surface corresponding to the side surface of the cushion pad.
6. According to another aspect of the present invention, the seat for vehicle includes a seat cushion on which an occupant is seated, and a seat back on which the occupant seated on the seat cushion leans. The seat back includes a cover, a cushion pad, and a backboard for covering the back surface of the cushion pad. The cover includes a trim cover for covering the surface of the cushion pad, on which the occupant leans, and a resin part made of flexible resin for covering the side surface of the cushion pad. The trim cover and the resin part are sewn and joined together. The resin part and the backboard are connected by engaging the hook or the protrusion formed on the backboard with the hook, the protrusion or the hole of the resin part.
7. In the seat for vehicle as described in the mode 6, preferably, the resin part of the cover has a section connected to the backboard thinner than the section for covering the side surface of the cushion pad.
8. In the seat for vehicle as described in the mode 7, preferably, the resin part of the cover and the backboard are connected by engaging the concavo-convex part formed on the resin part with the concavo-convex part formed on the backboard on the surface corresponding to the side surface of the cushion pad.
9. According to another aspect of the present invention, provided is the method of manufacturing a seat for vehicle which includes a seat cushion on which an occupant is seated, and a seat back on which the occupant seated on the seat cushion leans. The seat back includes a base seat provided with a cushion pad and a backboard for covering the back surface of the cushion pad, and a cover provided with a trim cover for covering the surface of the cushion pad of the base seat, on which the seated occupant leans, and a resin part made of flexible resin for covering the side surface of the cushion pad. The trim cover and the resin part of the cover are sewn and joined together. In the state where the seat cushion and the base seat are assembled, the method includes the steps of inserting the resin part of the cover into the part at which the seat cushion and the base seat are brought into contact with each other, engaging the hook, the protrusion, or the hole of the resin part with the hook or the hole of the backboard, bringing the concavo-convex part formed on the resin part of the cover in mesh with the concavo-convex part formed on the side surface of the backboard for engagement so as to connect the cover and the base seat.

10. In the method of manufacturing seat for vehicle as described in the mode 9, preferably, the concavo-convex part formed on the resin part of the cover is brought in mesh with the concavo-convex part formed on the side surface of the backboard for engagement in the state where the tension is applied by pulling the resin part of the cover.

What is claimed is:

1. A seat for vehicle comprising:
a skin;
a substrate to which the skin is applied; and
a connection structure for connecting the substrate and the skin, wherein:
the skin includes a first skin part, and a second skin part made of a soft material for connecting the first skin part and the connection structure;
the connection structure includes a first fold-back portion integrally formed with the second skin part, and a second fold-back portion disposed on the substrate;
the first fold-back portion is fitted with the second fold-back portion;
the connection structure further includes a protruding member integrally formed with the second skin part, and a hole formed in the substrate;
the protruding member includes a shaft portion extending in a direction of the substrate, and a head portion disposed on a tip end of the shaft portion; and
the protruding member is fitted with the hole.

2. A seat for vehicle comprising:
a skin;
a substrate to which the skin is applied; and
a connection structure for connecting the substrate and the skin, wherein:
the skin includes a first skin part, and a second skin part made of a soft material for connecting the first skin part and the connection structure;
the connection structure includes a first fold-back portion integrally formed with the second skin part, and a second fold-back portion disposed on the substrate;
the first fold-back portion is fitted with the second fold-back portion;
the connection structure further includes a protruding member integrally formed with the second skin part, and a hole formed in the substrate;
the protruding member includes a first section extending in a direction of the substrate, and a second section extending in an upward direction of the substrate from a tip end of the first section; and
the protruding member is fitted with the hole.

3. A seat for vehicle comprising:
a skin;
a substrate to which the skin is applied; and
a connection structure for connecting the substrate and the skin, wherein:
the skin includes a first skin part, and a second skin part made of a soft material for connecting the first skin part and the connection structure;
the connection structure includes a protruding member integrally formed with the second skin part, and a hole formed in the substrate;
the protruding member includes an insertion part extending in a direction of the substrate, and a knob extending from an end of the second skin part;
the insertion part includes a shaft portion extending in a direction of the substrate, and a head portion disposed on a tip end of the shaft portion; and
the insertion part is fitted with the hole.

4. The seat for vehicle according to claim 3, wherein a diameter of the hole is smaller than a diameter of the head portion.

5. The seat for vehicle according to claim 4, wherein the second skin part is connected to a peripheral edge of the first skin part.

6. The seat for vehicle according to claim 5, wherein the peripheral edges of the first skin part and a peripheral edge of the second skin part are sewn.

7. The seat for vehicle according to claim 3, wherein the soft material is one of an elastomer, a soft resin, a formed nonwoven fabric, and a combination thereof.

8. The seat for vehicle according to claim 3, wherein the substrate is one of a frame of a seat back, a backboard supported by the frame of the seat back, and the backboard serving as the frame.

9. The seat for vehicle according to claim 3, wherein the substrate is one of a frame of a seat cushion, and a side cover of the seat cushion.

* * * * *